(12) United States Patent
Schoolcraft

(10) Patent No.: US 11,215,268 B2
(45) Date of Patent: Jan. 4, 2022

(54) CONTINUOUSLY VARIABLE TRANSMISSIONS, SYNCHRONOUS SHIFTING, TWIN COUNTERSHAFTS AND METHODS FOR CONTROL OF SAME

(71) Applicant: Fallbrook Intellectual Property Company LLC, Leander, TX (US)

(72) Inventor: Brian Schoolcraft, Cedar Park, TX (US)

(73) Assignee: Fallbrook Intellectual Property Company LLC, Leander, TX (US)

(*) Notice: Subject to any disclaimer, the term of this patent is extended or adjusted under 35 U.S.C. 154(b) by 0 days.

(21) Appl. No.: 16/674,785

(22) Filed: Nov. 5, 2019

(65) Prior Publication Data

US 2020/0173527 A1   Jun. 4, 2020

Related U.S. Application Data

(60) Provisional application No. 62/756,478, filed on Nov. 6, 2018.

(51) Int. Cl.
| | |
|---|---|
| *F16H 37/02* | (2006.01) |
| *F16H 37/06* | (2006.01) |
| *B60K 17/08* | (2006.01) |
| *B60W 30/182* | (2020.01) |
| *B60W 10/04* | (2006.01) |

(Continued)

(52) U.S. Cl.
CPC .......... *F16H 37/022* (2013.01); *B60K 17/08* (2013.01); *B60W 10/04* (2013.01); *B60W 10/101* (2013.01); *B60W 30/182* (2013.01); *F16H 3/44* (2013.01); *F16H 37/065* (2013.01); *B60W 2710/1005* (2013.01);
(Continued)

(58) Field of Classification Search
None
See application file for complete search history.

(56) References Cited

U.S. PATENT DOCUMENTS

| | | |
|---|---|---|
| 225,933 A | 3/1880 | Kellogg |
| 719,595 A | 2/1903 | Huss |

(Continued)

FOREIGN PATENT DOCUMENTS

| | | |
|---|---|---|
| CH | 118064 | 12/1926 |
| CN | 1047556 | 12/1990 |

(Continued)

OTHER PUBLICATIONS

Examination Report dated Dec. 17, 2020 in Indian Patent Application No. 201837029026, 7 pages.

(Continued)

*Primary Examiner* — Dirk Wright
(74) *Attorney, Agent, or Firm* — Sheppard, Mullin, Richter & Hampton LLP

(57) ABSTRACT

Systems and methods for controlling transmissions having CVTs are disclosed with multiple modes and gearing arrangements for range enhancements, where embodiments include synchronous shifting to allow the transmission to achieve a continuous range of transmission ratios, while minimizing "empty" cycling of the CVT during mode shifts. Embodiments provide for wide ratio range and performance and efficiency flexibility, while maximizing CVT usage through synchronous shifting.

11 Claims, 22 Drawing Sheets

(51) Int. Cl.
*B60W 10/101* (2012.01)
*F16H 3/44* (2006.01)

(52) U.S. Cl.
CPC .. *F16H 2003/442* (2013.01); *F16H 2200/201* (2013.01); *F16H 2306/40* (2013.01); *F16H 2702/02* (2013.01)

(56) References Cited

U.S. PATENT DOCUMENTS

| | | |
|---|---|---|
| 721,663 A | 3/1903 | Brooke |
| 1,121,210 A | 12/1914 | Techel |
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,629,092 A | 5/1927 | Crockett |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,947,044 A | 2/1934 | Gove |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,097,631 A | 11/1937 | Madle |
| 2,100,629 A | 11/1937 | Chilton |
| 2,109,845 A | 3/1938 | Madle |
| 2,112,763 A | 3/1938 | Cloudsley |
| 2,123,008 A | 7/1938 | Hayes |
| 2,131,158 A | 9/1938 | Almen et al. |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Monge |
| 2,563,370 A | 8/1951 | Reese |
| 2,586,725 A | 2/1952 | Henry |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 2,982,154 A | 5/1961 | Zapletal |
| 3,008,061 A | 11/1961 | Mims et al. |
| 3,028,778 A | 4/1962 | Hayward |
| 3,035,460 A | 5/1962 | Guichard |
| 3,048,056 A | 8/1962 | Wolfram |
| 3,051,020 A | 8/1962 | Hartupee |
| 3,081,641 A | 3/1963 | Iseman |
| 3,086,704 A | 4/1963 | Hurtt |
| 3,087,348 A | 4/1963 | Kraus |
| 3,088,704 A | 5/1963 | Grady |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,207,248 A | 9/1965 | Strom |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,277,745 A | 10/1966 | Harned |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,413,896 A | 12/1968 | Wildhaber |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Azuma |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,743,063 A | 7/1973 | Blechschmidt |
| 3,745,844 A | 7/1973 | Schottler |
| 3,768,715 A | 10/1973 | Tout |
| 3,769,849 A | 11/1973 | Hagen |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,984,129 A | 10/1976 | Hege |
| 3,987,681 A | 10/1976 | Keithley et al. |
| 3,996,807 A | 12/1976 | Adams |
| 4,023,442 A | 5/1977 | Woods et al. |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,186 A | 5/1983 | Denholm |
| 4,382,188 A | 5/1983 | Cronin |
| 4,391,156 A | 7/1983 | Tibbals |
| 4,456,233 A | 6/1984 | Mueller |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |

(56) References Cited

U.S. PATENT DOCUMENTS

| | | |
|---|---|---|
| 4,515,040 A | 5/1985 | Takeuchi et al. |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,592,247 A | 6/1986 | Mutshler et al. |
| 4,617,838 A | 10/1986 | Anderson |
| 4,628,766 A | 12/1986 | de Brie Perry |
| 4,630,839 A | 12/1986 | Seol |
| 4,631,469 A | 12/1986 | Tsuboi et al. |
| 4,643,048 A | 2/1987 | Hattori |
| 4,651,082 A | 3/1987 | Kaneyuki |
| 4,663,990 A | 5/1987 | Itoh et al. |
| 4,667,525 A | 5/1987 | Schottler |
| 4,700,581 A | 10/1987 | Tibbals, Jr. |
| 4,706,518 A | 11/1987 | Moroto |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,857,035 A | 8/1989 | Anderson |
| 4,869,130 A | 9/1989 | Wiecko |
| 4,881,925 A | 11/1989 | Hattori |
| 4,884,473 A | 12/1989 | Lew |
| 4,900,046 A | 2/1990 | Aranceta-Angoitia |
| 4,909,101 A | 3/1990 | Terry |
| 4,918,344 A | 4/1990 | Chikamori et al. |
| 4,961,477 A | 10/1990 | Sweeney |
| 4,964,312 A | 10/1990 | Kraus |
| 4,976,170 A | 12/1990 | Hayashi |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schievelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,166,879 A | 11/1992 | Greene |
| 5,194,052 A | 3/1993 | Ueda |
| 5,230,258 A | 7/1993 | Nakano |
| 5,236,211 A | 8/1993 | Meguerditchian |
| 5,236,403 A | 8/1993 | Schievelbusch |
| 5,261,858 A | 11/1993 | Browning |
| 5,267,920 A | 12/1993 | Hibi |
| 5,269,726 A | 12/1993 | Swanson |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,356,348 A | 10/1994 | Bellio |
| 5,375,865 A | 12/1994 | Terry, Sr. |
| 5,379,661 A | 1/1995 | Nakano |
| 5,383,000 A | 1/1995 | Michaloski |
| 5,383,677 A | 1/1995 | Thomas |
| 5,387,000 A | 2/1995 | Sato |
| 5,401,221 A | 3/1995 | Fellows et al. |
| 5,413,540 A | 5/1995 | Streib |
| 5,451,070 A | 9/1995 | Lindsay et al. |
| 5,476,019 A | 12/1995 | Cheever |
| 5,489,003 A | 2/1996 | Ohyama et al. |
| 5,508,574 A | 4/1996 | Vlock |
| 5,514,047 A | 5/1996 | Tibbles |
| 5,526,261 A | 6/1996 | Kallis |
| 5,531,510 A | 7/1996 | Yamane |
| 5,562,564 A | 10/1996 | Folino |
| 5,564,998 A * | 10/1996 | Fellows ............... F16H 37/086 |
| | | 475/216 |
| 5,577,423 A | 11/1996 | Mimura |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,669,846 A | 9/1997 | Moroto |
| 5,683,322 A | 11/1997 | Meyerle |
| 5,690,346 A | 11/1997 | Keskitalo |
| 5,701,786 A | 12/1997 | Kawakami |
| 5,720,687 A * | 2/1998 | Bennett ............... F16H 37/086 |
| | | 475/214 |
| D391,824 S | 3/1998 | Larson |
| D391,825 S | 3/1998 | Larson |
| 5,722,502 A | 3/1998 | Kubo |
| 5,746,676 A | 5/1998 | Kawase et al. |
| 5,755,303 A | 5/1998 | Yamamoto et al. |
| D396,396 S | 7/1998 | Larson |
| 5,799,541 A | 9/1998 | Arbeiter |
| 5,819,864 A | 10/1998 | Koike |
| 5,823,052 A | 10/1998 | Nobumoto |
| 5,823,058 A | 10/1998 | Arbeiter |
| 5,839,083 A | 11/1998 | Sugiyama |
| 5,846,155 A | 12/1998 | Taniguchi et al. |
| 5,857,387 A | 1/1999 | Larson |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,964,123 A | 10/1999 | Arbeiter |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe et al. |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,047,230 A | 4/2000 | Spencer |
| 6,053,833 A | 4/2000 | Masaki |
| 6,053,841 A | 4/2000 | Kolde et al. |
| 6,054,844 A | 4/2000 | Frank |
| 6,056,661 A * | 5/2000 | Schmidt ............... F16H 37/022 |
| | | 475/207 |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,085,140 A | 7/2000 | Choi |
| 6,085,521 A | 7/2000 | Folsom et al. |
| 6,086,506 A | 7/2000 | Petersmann et al. |
| 6,095,940 A | 8/2000 | Ai et al. |
| 6,095,945 A | 8/2000 | Graf |
| 6,099,431 A | 8/2000 | Hoge et al. |
| 6,101,895 A | 8/2000 | Yamane |
| 6,113,513 A | 9/2000 | Itoh et al. |
| 6,119,539 A | 9/2000 | Papanicolaou |
| 6,119,800 A | 9/2000 | McComber |
| 6,125,314 A | 9/2000 | Graf et al. |
| 6,146,297 A | 11/2000 | Kimura |

(56) References Cited

U.S. PATENT DOCUMENTS

| | | |
|---|---|---|
| 6,159,126 A | 12/2000 | Oshidari |
| 6,171,210 B1 | 1/2001 | Miyata et al. |
| 6,171,212 B1 | 1/2001 | Reuschel |
| 6,174,260 B1 | 1/2001 | Tsukada et al. |
| 6,182,000 B1 | 1/2001 | Ohta |
| 6,186,922 B1 | 2/2001 | Bursal |
| 6,188,945 B1 | 2/2001 | Graf |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,251,043 B1 | 6/2001 | Gierling |
| 6,258,003 B1 | 7/2001 | Hirano et al. |
| 6,261,200 B1 | 7/2001 | Miyata et al. |
| 6,266,931 B1 | 7/2001 | Erickson |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,340,067 B1 | 1/2002 | Fujiwara |
| 6,356,817 B1 | 3/2002 | Abe |
| 6,358,174 B1 | 3/2002 | Folsom et al. |
| 6,358,178 B1 | 3/2002 | Wittkopp |
| 6,367,833 B1 | 4/2002 | Horiuchi |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,035 B2 | 8/2002 | Tsukada et al. |
| 6,440,037 B2 | 8/2002 | Takagi et al. |
| 6,449,548 B1 | 9/2002 | Jain |
| 6,459,978 B2 | 10/2002 | Tamiguchi et al. |
| 6,461,268 B1 | 10/2002 | Milner |
| 6,470,252 B2 | 10/2002 | Tashiro |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,513,405 B1 | 2/2003 | Stuermer |
| 6,514,175 B2 | 2/2003 | Taniguchi et al. |
| 6,520,878 B1 | 2/2003 | Leclair |
| 6,522,965 B1 | 2/2003 | Gierling |
| 6,527,662 B2 | 3/2003 | Miyata |
| 6,532,890 B2 | 3/2003 | Chen |
| 6,551,210 B2 | 4/2003 | Miller |
| 6,558,285 B1 | 5/2003 | Sieber |
| 6,561,941 B2 | 5/2003 | Nakano et al. |
| 6,571,920 B1 | 6/2003 | Sturmer |
| 6,575,047 B2 | 6/2003 | Reik et al. |
| 6,588,296 B2 | 7/2003 | Wessel |
| 6,658,338 B2 | 12/2003 | Joe et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,681,652 B2 | 1/2004 | Auer |
| 6,682,432 B1 | 1/2004 | Shinozuka |
| 6,684,143 B2 | 1/2004 | Graf |
| 6,689,012 B2 | 2/2004 | Miller |
| 6,694,241 B2 | 2/2004 | Kim |
| 6,718,247 B1 | 4/2004 | Graf |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 * | 2/2005 | Sumi ..................... F16H 37/086 475/211 |
| 6,859,709 B2 | 2/2005 | Joe et al. |
| 6,868,949 B2 | 3/2005 | Braford |
| 6,909,953 B2 | 6/2005 | Joe |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 6,994,189 B2 | 2/2006 | Chen |
| 7,000,496 B2 | 2/2006 | Wessel |
| 7,004,487 B2 | 2/2006 | Matsumoto |
| 7,011,600 B2 | 3/2006 | Miller et al. |
| 7,011,601 B2 | 3/2006 | Miller |
| 7,011,602 B2 | 3/2006 | Makiyama |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,163,846 B2 | 1/2007 | Sakai |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,207,918 B2 | 4/2007 | Shimazu |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,226,379 B2 | 6/2007 | Ibamoto |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |

(56) References Cited

U.S. PATENT DOCUMENTS

| | | |
|---|---|---|
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,748 B2 | 6/2008 | Rankin |
| 7,383,749 B2 | 6/2008 | Schaefer |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,717,815 B2 * | 5/2010 | Tenberge ............... B60K 6/543 475/5 |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,300 B2 | 6/2010 | Gerstenslager |
| 7,731,615 B2 | 6/2010 | Miller et al. |
| 7,762,919 B2 | 7/2010 | Smithson et al. |
| 7,762,920 B2 | 7/2010 | Smithson et al. |
| 7,770,674 B2 | 8/2010 | Miles |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,663,052 B2 * | 3/2014 | Sich ............... F16H 37/0846 475/211 |
| 8,678,974 B2 | 3/2014 | Lohr |
| 8,688,337 B2 | 4/2014 | Takanami |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,814,739 B1 | 8/2014 | Hamrin et al. |
| 8,818,661 B2 | 8/2014 | Kellers et al. |
| 8,827,856 B1 | 9/2014 | Younggren et al. |
| 8,827,864 B2 | 9/2014 | Durack |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,956,262 B2 | 2/2015 | Tomomatsu et al. |
| 8,961,363 B2 | 2/2015 | Shiina et al. |
| 8,968,152 B2 * | 3/2015 | Beaudoin ............. F16H 37/02 477/41 |
| 8,992,376 B2 | 3/2015 | Ogawa et al. |
| 8,996,263 B2 * | 3/2015 | Quinn, Jr. ........... F16H 61/6649 701/55 |
| 9,017,207 B2 | 4/2015 | Pohl et al. |
| 9,022,889 B2 | 5/2015 | Miller |
| 9,046,158 B2 | 6/2015 | Miller et al. |
| 9,052,000 B2 | 6/2015 | Cooper |
| 9,074,674 B2 | 7/2015 | Nichols et al. |
| 9,086,145 B2 | 7/2015 | Pohl et al. |
| 9,121,464 B2 | 9/2015 | Nichols et al. |
| 9,182,018 B2 | 11/2015 | Bazyn et al. |
| 9,239,099 B2 | 1/2016 | Carter et al. |
| 9,249,880 B2 | 2/2016 | Vasiliotis et al. |
| 9,273,760 B2 | 3/2016 | Pohl et al. |

(56) References Cited

U.S. PATENT DOCUMENTS

| | | |
|---|---|---|
| 9,279,482 B2 | 3/2016 | Nichols et al. |
| 9,291,251 B2 | 3/2016 | Lohr et al. |
| 9,328,807 B2 | 5/2016 | Carter et al. |
| 9,341,246 B2 | 5/2016 | Miller et al. |
| 9,360,089 B2 | 6/2016 | Lohr et al. |
| 9,365,203 B2 | 6/2016 | Keilers et al. |
| 9,371,894 B2 | 6/2016 | Carter et al. |
| 9,388,896 B2 | 7/2016 | Hibino et al. |
| 9,506,562 B2 | 11/2016 | Miller et al. |
| 9,528,561 B2 | 12/2016 | Nichols et al. |
| 9,541,179 B2 * | 1/2017 | Cooper .................. F16H 15/28 |
| 9,574,642 B2 | 2/2017 | Pohl et al. |
| 9,574,643 B2 | 2/2017 | Pohl |
| 9,611,921 B2 | 4/2017 | Thomassy et al. |
| 9,618,100 B2 | 4/2017 | Lohr |
| 9,656,672 B2 | 5/2017 | Schieffelin |
| 9,676,391 B2 | 6/2017 | Carter et al. |
| 9,677,650 B2 | 6/2017 | Nichols et al. |
| 9,683,638 B2 | 6/2017 | Kostrup |
| 9,683,640 B2 | 6/2017 | Lohr et al. |
| 9,709,138 B2 | 7/2017 | Miller et al. |
| 9,726,282 B2 | 8/2017 | Pohl et al. |
| 9,732,848 B2 | 8/2017 | Miller et al. |
| 9,739,375 B2 | 8/2017 | Vasiliotis et al. |
| 9,833,201 B2 | 12/2017 | Niederberger |
| 9,850,993 B2 | 12/2017 | Bazyn et al. |
| 9,869,388 B2 | 1/2018 | Pohl et al. |
| 9,878,717 B2 | 1/2018 | Kellers et al. |
| 9,878,719 B2 | 1/2018 | Carter et al. |
| 9,903,450 B2 | 2/2018 | Thomassy |
| 9,909,657 B2 * | 3/2018 | Uchino ................. F16H 37/021 |
| 9,920,823 B2 | 3/2018 | Nichols et al. |
| 9,945,456 B2 | 4/2018 | Nichols et al. |
| 9,950,608 B2 | 4/2018 | Miller et al. |
| 9,963,199 B2 | 5/2018 | Hancock et al. |
| 10,023,266 B2 | 7/2018 | Contello et al. |
| 10,036,453 B2 | 7/2018 | Smithson |
| 10,047,861 B2 | 8/2018 | Thomassy et al. |
| 10,056,811 B2 | 8/2018 | Pohl |
| 10,066,712 B2 | 9/2018 | Lohr et al. |
| 10,066,713 B2 | 9/2018 | Nichols et al. |
| 10,088,026 B2 * | 10/2018 | Versteyhe ............... F16H 15/28 |
| 10,100,927 B2 * | 10/2018 | Quinn, Jr. ............... F16H 61/12 |
| 10,197,147 B2 | 2/2019 | Lohr et al. |
| 10,208,840 B2 | 2/2019 | Nichols et al. |
| 10,252,881 B2 | 4/2019 | Hamrin |
| 10,253,859 B2 * | 4/2019 | Schoolcraft ........... F16H 37/086 |
| 10,253,880 B2 | 4/2019 | Pohl |
| 10,253,881 B2 | 4/2019 | Hamrin |
| 10,260,607 B2 | 4/2019 | Carter et al. |
| 10,323,732 B2 | 6/2019 | Nichols et al. |
| 10,400,872 B2 | 9/2019 | Lohr |
| 10,428,915 B2 | 10/2019 | Thomassy et al. |
| 10,428,939 B2 | 10/2019 | Miller et al. |
| 10,458,526 B2 | 10/2019 | Nichols et al. |
| 10,634,224 B2 | 4/2020 | Lohr et al. |
| 10,703,372 B2 | 7/2020 | Carter et al. |
| 10,704,657 B2 | 7/2020 | Thomassy et al. |
| 10,704,687 B2 | 7/2020 | Vasiliotis et al. |
| 10,711,869 B2 | 7/2020 | Miller et al. |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2001/0046920 A1 | 11/2001 | Sugihara |
| 2002/0017819 A1 | 2/2002 | Chen |
| 2002/0019285 A1 | 2/2002 | Henzler |
| 2002/0025875 A1 | 2/2002 | Tsujioka |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0151401 A1 | 10/2002 | Lemanski |
| 2002/0161503 A1 | 10/2002 | Joe et al. |
| 2002/0169051 A1 | 11/2002 | Oshidari |
| 2002/0179348 A1 | 12/2002 | Tamai et al. |
| 2002/0189524 A1 | 12/2002 | Chen |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0096674 A1 | 5/2003 | Uno |
| 2003/0132051 A1 | 7/2003 | Nishii et al. |
| 2003/0135316 A1 | 7/2003 | Kawamura et al. |
| 2003/0144105 A1 | 7/2003 | O'Hora |
| 2003/0151300 A1 | 8/2003 | Goss |
| 2003/0160420 A1 | 8/2003 | Fukuda |
| 2003/0181286 A1 | 9/2003 | Miller |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0051375 A1 | 3/2004 | Uno |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0087412 A1 | 5/2004 | Mori |
| 2004/0092359 A1 | 5/2004 | Imanishi et al. |
| 2004/0119345 A1 | 6/2004 | Takano |
| 2004/0171452 A1 | 9/2004 | Miller |
| 2004/0171457 A1 | 9/2004 | Fuller |
| 2004/0204283 A1 | 10/2004 | Inoue |
| 2004/0224808 A1 | 11/2004 | Miller |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0037886 A1 | 2/2005 | Lemansky |
| 2005/0064986 A1 | 3/2005 | Ginglas |
| 2005/0073127 A1 | 4/2005 | Miller |
| 2005/0079948 A1 | 4/2005 | Miller |
| 2005/0085326 A1 | 4/2005 | Miller |
| 2005/0085327 A1 | 4/2005 | Miller |
| 2005/0085334 A1 | 4/2005 | Miller |
| 2005/0085336 A1 | 4/2005 | Miller |
| 2005/0085337 A1 | 4/2005 | Miller |
| 2005/0085338 A1 | 4/2005 | Miller |
| 2005/0085979 A1 | 4/2005 | Carlson et al. |
| 2005/0096176 A1 | 5/2005 | Miller |
| 2005/0096179 A1 | 5/2005 | Miller |
| 2005/0113202 A1 | 5/2005 | Miller |
| 2005/0113210 A1 | 5/2005 | Miller |
| 2005/0117983 A1 | 6/2005 | Miller |
| 2005/0119086 A1 | 6/2005 | Miller |
| 2005/0119087 A1 | 6/2005 | Miller |
| 2005/0119090 A1 | 6/2005 | Miller |
| 2005/0119093 A1 | 6/2005 | Miller |
| 2005/0124453 A1 | 6/2005 | Miller |
| 2005/0124456 A1 | 6/2005 | Miller |
| 2005/0130784 A1 | 6/2005 | Miller |
| 2005/0137046 A1 | 6/2005 | Miller |
| 2005/0137051 A1 | 6/2005 | Miller |
| 2005/0137052 A1 | 6/2005 | Miller |
| 2005/0148422 A1 | 7/2005 | Miller |
| 2005/0148423 A1 | 7/2005 | Miller |
| 2005/0153808 A1 | 7/2005 | Miller |
| 2005/0153809 A1 | 7/2005 | Miller |
| 2005/0153810 A1 | 7/2005 | Miller |
| 2005/0159265 A1 | 7/2005 | Miller |
| 2005/0159266 A1 | 7/2005 | Miller |
| 2005/0159267 A1 | 7/2005 | Miller |
| 2005/0164819 A1 | 7/2005 | Miller |
| 2005/0170927 A1 | 8/2005 | Miller |
| 2005/0176544 A1 | 8/2005 | Miller |
| 2005/0176545 A1 | 8/2005 | Miller |
| 2005/0178893 A1 | 8/2005 | Miller |
| 2005/0181905 A1 | 8/2005 | Ali et al. |
| 2005/0184580 A1 | 8/2005 | Kuan et al. |
| 2005/0197231 A1 | 9/2005 | Miller |
| 2005/0209041 A1 | 9/2005 | Miller |
| 2005/0227809 A1 | 10/2005 | Bitzer et al. |
| 2005/0229731 A1 | 10/2005 | Parks et al. |
| 2005/0233846 A1 | 10/2005 | Green et al. |

(56) References Cited

U.S. PATENT DOCUMENTS

| | | |
|---|---|---|
| 2005/0255957 A1 | 11/2005 | Miller |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0054422 A1 | 3/2006 | Dimsey et al. |
| 2006/0084549 A1 | 4/2006 | Smithson |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004554 A1 | 1/2007 | Hans |
| 2007/0004556 A1 | 1/2007 | Rohs et al. |
| 2007/0041823 A1 | 2/2007 | Miller |
| 2007/0049450 A1 | 3/2007 | Miller |
| 2007/0082770 A1 | 4/2007 | Nihei |
| 2007/0099753 A1 | 5/2007 | Matsui et al. |
| 2007/0142161 A1 | 6/2007 | Miller |
| 2007/0149342 A1 | 6/2007 | Guenter et al. |
| 2007/0155552 A1 | 7/2007 | De Cloe |
| 2007/0155567 A1 | 7/2007 | Miller |
| 2007/0155580 A1 | 7/2007 | Nichols |
| 2007/0167274 A1 | 7/2007 | Petrzik |
| 2007/0167276 A1 | 7/2007 | Miller |
| 2007/0167277 A1 | 7/2007 | Miller |
| 2007/0167278 A1 | 7/2007 | Miller |
| 2007/0167280 A1 | 7/2007 | Miller |
| 2007/0179013 A1 | 8/2007 | Miller |
| 2007/0193391 A1 | 8/2007 | Armstrong et al. |
| 2007/0197337 A1 | 8/2007 | Miller |
| 2007/0219048 A1 | 9/2007 | Yamaguchi |
| 2007/0219696 A1 | 9/2007 | Miller |
| 2007/0228687 A1 | 10/2007 | Parker |
| 2007/0232423 A1 | 10/2007 | Katou et al. |
| 2007/0245846 A1 | 10/2007 | Armstrong |
| 2007/0270265 A1 | 11/2007 | Miller |
| 2007/0270266 A1 | 11/2007 | Miller |
| 2007/0270267 A1 | 11/2007 | Miller |
| 2007/0270268 A1 | 11/2007 | Miller |
| 2007/0270269 A1 | 11/2007 | Miller |
| 2007/0270270 A1 | 11/2007 | Miller |
| 2007/0270271 A1 | 11/2007 | Miller |
| 2007/0270272 A1 | 11/2007 | Miller |
| 2007/0270278 A1 | 11/2007 | Miller |
| 2007/0275809 A1 | 11/2007 | Miller |
| 2007/0281819 A1 | 12/2007 | Miller |
| 2007/0287578 A1 | 12/2007 | Miller |
| 2007/0287579 A1 | 12/2007 | Miller |
| 2007/0287580 A1 | 12/2007 | Miller |
| 2008/0004008 A1 | 1/2008 | Nicol |
| 2008/0009389 A1 | 1/2008 | Jacobs |
| 2008/0032852 A1 | 2/2008 | Smithson et al. |
| 2008/0032853 A1 | 2/2008 | Smithson |
| 2008/0032854 A1 | 2/2008 | Smithson et al. |
| 2008/0034585 A1 | 2/2008 | Smithson |
| 2008/0034586 A1 | 2/2008 | Smithson |
| 2008/0039269 A1 | 2/2008 | Smithson |
| 2008/0039270 A1 | 2/2008 | Smithson |
| 2008/0039272 A1 | 2/2008 | Smithson |
| 2008/0039273 A1 | 2/2008 | Smithson et al. |
| 2008/0039274 A1 | 2/2008 | Smithson |
| 2008/0039275 A1 | 2/2008 | Smithson |
| 2008/0039276 A1 | 2/2008 | Smithson et al. |
| 2008/0039277 A1 | 2/2008 | Smithson |
| 2008/0040008 A1 | 2/2008 | Smithson |
| 2008/0070729 A1 | 3/2008 | Miller |
| 2008/0071436 A1 | 3/2008 | Dube |
| 2008/0073136 A1 | 3/2008 | Miller |
| 2008/0073137 A1 | 3/2008 | Miller |
| 2008/0073467 A1 | 3/2008 | Miller |
| 2008/0079236 A1 | 4/2008 | Miller |
| 2008/0081715 A1 | 4/2008 | Miller |
| 2008/0081728 A1 | 4/2008 | Faulring et al. |
| 2008/0085795 A1 | 4/2008 | Miller |
| 2008/0085796 A1 | 4/2008 | Miller |
| 2008/0085797 A1 | 4/2008 | Miller |
| 2008/0085798 A1 | 4/2008 | Miller |
| 2008/0121486 A1 | 5/2008 | Miller |
| 2008/0121487 A1 | 5/2008 | Miller |
| 2008/0125281 A1 | 5/2008 | Miller |
| 2008/0125282 A1 | 5/2008 | Miller |
| 2008/0132373 A1 | 6/2008 | Miller |
| 2008/0132377 A1 | 6/2008 | Miller |
| 2008/0139363 A1 | 6/2008 | Williams |
| 2008/0141809 A1 | 6/2008 | Miller |
| 2008/0141810 A1 | 6/2008 | Miller |
| 2008/0146403 A1 | 6/2008 | Miller |
| 2008/0146404 A1 | 6/2008 | Miller |
| 2008/0149407 A1 | 6/2008 | Shibata et al. |
| 2008/0161151 A1 | 7/2008 | Miller |
| 2008/0183358 A1 | 7/2008 | Thomson et al. |
| 2008/0188345 A1 | 8/2008 | Miller |
| 2008/0200300 A1 | 8/2008 | Smithson et al. |
| 2008/0228362 A1 | 9/2008 | Muller et al. |
| 2008/0236319 A1 | 10/2008 | Nichols |
| 2008/0248917 A1 | 10/2008 | Nichols |
| 2008/0261771 A1 | 10/2008 | Nichols |
| 2008/0284170 A1 | 11/2008 | Cory |
| 2008/0305920 A1 | 12/2008 | Nishii et al. |
| 2009/0011907 A1 | 1/2009 | Radow |
| 2009/0023545 A1* | 1/2009 | Beaudoin ............ F16H 61/6648 476/42 |
| 2009/0055061 A1 | 2/2009 | Zhu |
| 2009/0062062 A1 | 3/2009 | Choi |
| 2009/0082169 A1 | 3/2009 | Kolstrup |
| 2009/0107454 A1 | 4/2009 | Hiyoshi et al. |
| 2009/0132135 A1 | 5/2009 | Quinn, Jr. |
| 2009/0164076 A1 | 6/2009 | Vasiliotis |
| 2009/0189397 A1 | 7/2009 | Miller |
| 2009/0221391 A1 | 9/2009 | Bazyn |
| 2009/0251013 A1 | 10/2009 | Vollmer et al. |
| 2009/0280949 A1 | 11/2009 | Lohr |
| 2009/0312145 A1 | 12/2009 | Pohl |
| 2009/0318261 A1 | 12/2009 | Tabata et al. |
| 2010/0056322 A1 | 3/2010 | Thomassy |
| 2010/0093479 A1 | 4/2010 | Carter et al. |
| 2010/0093480 A1 | 4/2010 | Pohl |
| 2010/0093485 A1 | 4/2010 | Pohl |
| 2010/0120577 A1 | 5/2010 | Gu et al. |
| 2010/0131164 A1 | 5/2010 | Carter |
| 2010/0145573 A1 | 6/2010 | Vasilescu |
| 2010/0181130 A1 | 7/2010 | Chou |
| 2010/0198453 A1 | 8/2010 | Dorogusker |
| 2010/0228405 A1 | 9/2010 | Morgal |
| 2010/0264620 A1 | 10/2010 | Miles |
| 2010/0267510 A1 | 10/2010 | Nichols |
| 2010/0313614 A1 | 12/2010 | Rzepecki |
| 2011/0034284 A1 | 2/2011 | Pohl |
| 2011/0088503 A1 | 4/2011 | Armstrong |
| 2011/0105274 A1 | 5/2011 | Lohr |
| 2011/0127096 A1 | 6/2011 | Schneidewind |
| 2011/0172050 A1 | 7/2011 | Nichols |
| 2011/0178684 A1 | 7/2011 | Umemoto et al. |
| 2011/0184614 A1 | 7/2011 | Keilers |
| 2011/0190093 A1 | 8/2011 | Bishop |
| 2011/0218072 A1 | 9/2011 | Lohr |
| 2011/0230297 A1 | 9/2011 | Shiina et al. |
| 2011/0237385 A1 | 9/2011 | Parise |
| 2011/0254673 A1 | 10/2011 | Jean |
| 2011/0291507 A1 | 12/2011 | Post |
| 2011/0319222 A1 | 12/2011 | Ogawa et al. |
| 2012/0029744 A1 | 2/2012 | Yun |
| 2012/0035011 A1 | 2/2012 | Menachem et al. |
| 2012/0035015 A1 | 2/2012 | Ogawa et al. |
| 2012/0035016 A1 | 2/2012 | Miller |
| 2012/0043841 A1 | 2/2012 | Miller |
| 2012/0115667 A1 | 5/2012 | Lohr |
| 2012/0130603 A1 | 5/2012 | Simpson et al. |
| 2012/0238386 A1 | 9/2012 | Pohl |

(56) References Cited

U.S. PATENT DOCUMENTS

| | | |
|---|---|---|
| 2012/0239235 A1 | 9/2012 | Voigtlaender |
| 2012/0258839 A1 | 10/2012 | Smithson et al. |
| 2012/0309579 A1 | 12/2012 | Miller |
| 2013/0035200 A1 | 2/2013 | Noji et al. |
| 2013/0053211 A1 | 2/2013 | Fukuda et al. |
| 2013/0072340 A1 | 3/2013 | Bazyn |
| 2013/0079191 A1 | 3/2013 | Lohr |
| 2013/0080006 A1 | 3/2013 | Vasiliotis |
| 2013/0095977 A1 | 4/2013 | Smithson |
| 2013/0102434 A1 | 4/2013 | Nichols |
| 2013/0106258 A1 | 5/2013 | Miller |
| 2013/0139531 A1 | 6/2013 | Pohl |
| 2013/0146406 A1 | 6/2013 | Nichols |
| 2013/0152715 A1 | 6/2013 | Pohl |
| 2013/0190123 A1 | 7/2013 | Pohl |
| 2013/0190125 A1 | 7/2013 | Nichols |
| 2013/0288844 A1 | 10/2013 | Thomassy |
| 2013/0288848 A1 | 10/2013 | Carter |
| 2013/0310214 A1 | 11/2013 | Pohl |
| 2013/0324344 A1 | 12/2013 | Pohl |
| 2013/0331218 A1 | 12/2013 | Lohr |
| 2013/0337971 A1 | 12/2013 | Kolstrup |
| 2014/0011619 A1 | 1/2014 | Pohl |
| 2014/0011628 A1 | 1/2014 | Lohr |
| 2014/0038771 A1 | 2/2014 | Miller |
| 2014/0073470 A1 | 3/2014 | Carter |
| 2014/0094339 A1 | 4/2014 | Ogawa et al. |
| 2014/0121922 A1 | 5/2014 | Vasiliotis |
| 2014/0128195 A1 | 5/2014 | Miller |
| 2014/0141919 A1 | 5/2014 | Bazyn |
| 2014/0144260 A1 | 5/2014 | Nichols |
| 2014/0148303 A1 | 5/2014 | Nichols |
| 2014/0155220 A1 | 6/2014 | Messier et al. |
| 2014/0179479 A1 | 6/2014 | Nichols |
| 2014/0206499 A1 | 7/2014 | Lohr |
| 2014/0228163 A1 | 8/2014 | Aratsu |
| 2014/0248988 A1 | 9/2014 | Lohr |
| 2014/0257650 A1 | 9/2014 | Carter |
| 2014/0274536 A1 | 9/2014 | Versteyhe |
| 2014/0323260 A1 | 10/2014 | Miller |
| 2014/0329637 A1 | 11/2014 | Thomassy |
| 2014/0335991 A1 | 11/2014 | Lohr |
| 2014/0365059 A1 | 12/2014 | Keilers |
| 2015/0018154 A1 | 1/2015 | Thomassy |
| 2015/0038285 A1 | 2/2015 | Aratsu |
| 2015/0039195 A1 | 2/2015 | Pohl |
| 2015/0051801 A1 | 2/2015 | Quinn, Jr. |
| 2015/0072827 A1 | 3/2015 | Lohr |
| 2015/0080165 A1 | 3/2015 | Pohl |
| 2015/0219194 A1 | 8/2015 | Winter et al. |
| 2015/0226323 A1 | 8/2015 | Pohl |
| 2015/0233473 A1 | 8/2015 | Miller |
| 2015/0260284 A1 | 9/2015 | Miller |
| 2015/0337928 A1 | 11/2015 | Smithson |
| 2015/0345599 A1 | 12/2015 | Ogawa |
| 2015/0360747 A1 | 12/2015 | Baumgaertner |
| 2015/0369348 A1 | 12/2015 | Nichols |
| 2015/0377305 A1 | 12/2015 | Nichols |
| 2016/0003349 A1 | 1/2016 | Kimura et al. |
| 2016/0031526 A1 | 2/2016 | Watarai |
| 2016/0039496 A1 | 2/2016 | Hancock |
| 2016/0040763 A1 | 2/2016 | Nichols |
| 2016/0061301 A1 | 3/2016 | Bazyn |
| 2016/0131231 A1 | 5/2016 | Carter |
| 2016/0146342 A1 | 5/2016 | Vasiliotis |
| 2016/0178037 A1 | 6/2016 | Pohl |
| 2016/0186847 A1 | 6/2016 | Nichols |
| 2016/0195177 A1* | 7/2016 | Versteyhe ............... F16H 37/10 475/189 |
| 2016/0201772 A1 | 7/2016 | Lohr |
| 2016/0244063 A1 | 8/2016 | Carter |
| 2016/0273627 A1 | 9/2016 | Miller |
| 2016/0281825 A1 | 9/2016 | Lohr |
| 2016/0290451 A1 | 10/2016 | Lohr |
| 2016/0298740 A1 | 10/2016 | Carter |
| 2016/0347411 A1 | 12/2016 | Yamamoto et al. |
| 2016/0362108 A1 | 12/2016 | Keilers |
| 2016/0377153 A1 | 12/2016 | Ajumobi |
| 2017/0072782 A1 | 3/2017 | Miller |
| 2017/0082049 A1 | 3/2017 | David et al. |
| 2017/0102053 A1 | 4/2017 | Nichols |
| 2017/0103053 A1 | 4/2017 | Guerra |
| 2017/0159812 A1 | 6/2017 | Pohl |
| 2017/0163138 A1 | 6/2017 | Pohl |
| 2017/0204948 A1 | 7/2017 | Thomassy |
| 2017/0204969 A1 | 7/2017 | Thomassy |
| 2017/0211696 A1 | 7/2017 | Nassouri |
| 2017/0211698 A1 | 7/2017 | Lohr |
| 2017/0225742 A1 | 8/2017 | Hancock |
| 2017/0268638 A1 | 9/2017 | Nichols |
| 2017/0274903 A1 | 9/2017 | Carter |
| 2017/0276217 A1 | 9/2017 | Nichols |
| 2017/0284519 A1 | 10/2017 | Kolstrup |
| 2017/0284520 A1 | 10/2017 | Lohr |
| 2017/0314655 A1 | 11/2017 | Miller |
| 2017/0328470 A1 | 11/2017 | Pohl |
| 2017/0335961 A1 | 11/2017 | Hamrin |
| 2017/0343105 A1 | 11/2017 | Vasiliotis |
| 2018/0066754 A1 | 3/2018 | Miller |
| 2018/0106359 A1 | 4/2018 | Bazyn et al. |
| 2018/0119786 A1* | 5/2018 | Mepham ................ F16H 37/10 |
| 2018/0134750 A1 | 5/2018 | Alkan |
| 2018/0148055 A1 | 5/2018 | Carter |
| 2018/0148056 A1 | 5/2018 | Kellers et al. |
| 2018/0195586 A1 | 7/2018 | Thomassy |
| 2018/0202527 A1 | 7/2018 | Nichols et al. |
| 2018/0236867 A1 | 8/2018 | Miller et al. |
| 2018/0251190 A1 | 9/2018 | Hancock et al. |
| 2018/0306283 A1 | 10/2018 | Engesather et al. |
| 2018/0327060 A1 | 11/2018 | Contello et al. |
| 2018/0347693 A1 | 12/2018 | Thomassy et al. |
| 2018/0372192 A1 | 12/2018 | Lohr |
| 2019/0049004 A1 | 2/2019 | Quinn et al. |
| 2019/0195321 A1 | 6/2019 | Smithson |
| 2019/0277399 A1 | 9/2019 | Guerin |
| 2019/0323582 A1 | 10/2019 | Horak |
| 2020/0018384 A1 | 1/2020 | Nichols et al. |

FOREIGN PATENT DOCUMENTS

| | | |
|---|---|---|
| CN | 1054340 | 9/1991 |
| CN | 2245830 | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 2320843 Y | 5/1999 |
| CN | 1281540 | 1/2001 |
| CN | 1283258 | 2/2001 |
| CN | 1297404 | 5/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1555466 | 12/2004 |
| CN | 1568407 | 1/2005 |
| CN | 1654858 | 8/2005 |
| CN | 2714896 | 8/2005 |
| CN | 1736791 | 2/2006 |
| CN | 1791731 | 6/2006 |
| CN | 1847702 | 10/2006 |
| CN | 1860315 | 11/2006 |
| CN | 1896562 | 1/2007 |
| CN | 1940348 | 4/2007 |
| CN | 101016076 | 8/2007 |
| CN | 101166922 | 4/2008 |
| CN | 101312867 | 11/2008 |
| CN | 201777370 U | 3/2011 |
| CN | 102165219 | 8/2011 |
| CN | 203358799 U | 12/2013 |
| DE | 498 701 | 5/1930 |
| DE | 866748 C | 2/1953 |

(56) References Cited

FOREIGN PATENT DOCUMENTS

| | | |
|---|---|---|
| DE | 1165372 B | 3/1964 |
| DE | 1171692 | 6/1964 |
| DE | 2021027 | 12/1970 |
| DE | 2 310880 | 9/1974 |
| DE | 2 136 243 | 1/1975 |
| DE | 2436496 | 2/1975 |
| DE | 3940919 | 6/1991 |
| DE | 4120540 C1 | 11/1992 |
| DE | 19851738 | 5/2000 |
| DE | 10155372 | 5/2003 |
| DE | 10261372 | 7/2003 |
| DE | 102009016869 | 10/2010 |
| DE | 102011016672 | 10/2012 |
| DE | 102012210842 | 1/2014 |
| DE | 102012212526 | 1/2014 |
| DE | 102012023551 | 6/2014 |
| DE | 102012222087 | 6/2014 |
| DE | 102013201101 | 7/2014 |
| DE | 102014007271 | 12/2014 |
| DE | 102013214169 | 1/2015 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0877341 | 11/1998 |
| EP | 0 976 956 | 2/2000 |
| EP | 1010612 | 6/2000 |
| EP | 1 136 724 | 9/2001 |
| EP | 1 188 602 | 3/2002 |
| EP | 1 251 294 | 10/2002 |
| EP | 1 366 978 | 3/2003 |
| EP | 1362783 | 11/2003 |
| EP | 1 433 641 | 6/2004 |
| EP | 1452441 | 9/2004 |
| EP | 1518785 | 3/2005 |
| EP | 1 624 230 | 2/2006 |
| EP | 1811202 | 7/2007 |
| EP | 2261108 | 12/2010 |
| EP | 2338782 | 6/2011 |
| EP | 2464560 | 6/2012 |
| EP | 2620672 | 7/2013 |
| EP | 2357128 | 8/2014 |
| EP | 2 893 219 | 7/2015 |
| EP | 2927534 | 10/2015 |
| FR | 620375 | 4/1927 |
| FR | 2460427 | 1/1981 |
| FR | 2590638 | 5/1987 |
| FR | 2909938 | 6/2008 |
| FR | 2996276 | 4/2014 |
| GB | 391448 | 4/1933 |
| GB | 592320 | 9/1947 |
| GB | 772749 A | 4/1957 |
| GB | 858710 | 1/1961 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 46-029087 B1 | 8/1971 |
| JP | 46029087 B | 8/1971 |
| JP | 47-000448 | 1/1972 |
| JP | 47962 B | 1/1972 |
| JP | 47-207 | 6/1972 |
| JP | 47-20535 | 6/1972 |
| JP | 47-1621 | 8/1972 |
| JP | 47-00962 | 11/1972 |
| JP | 47-29762 | 11/1972 |
| JP | 4854371 | 7/1973 |
| JP | 49-012742 | 3/1974 |
| JP | 4912742 | 3/1974 |
| JP | 49-013823 | 4/1974 |
| JP | 49-041536 | 11/1974 |
| JP | 49041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 53-50395 U | 4/1978 |
| JP | 55-135259 | 10/1980 |
| JP | 56-24251 | 3/1981 |
| JP | 56-047231 | 4/1981 |
| JP | 56-101448 | 8/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 6073958 U | 5/1985 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-125854 | 5/1988 |
| JP | 63-219953 | 9/1988 |
| JP | 63-160465 | 10/1988 |
| JP | 01210653 | 8/1989 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 422843 B | 1/1992 |
| JP | 470207 | 3/1992 |
| JP | 470962 | 3/1992 |
| JP | 479762 | 3/1992 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 0650358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-135748 | 5/1996 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-225053 | 8/1998 |
| JP | 10-511621 | 11/1998 |
| JP | H10307964 | 11/1998 |
| JP | 11-063130 | 3/1999 |
| JP | 11-091411 | 4/1999 |

(56) References Cited

FOREIGN PATENT DOCUMENTS

| | | |
|---|---|---|
| JP | 11-210850 | 8/1999 |
| JP | 11-227669 | 8/1999 |
| JP | 11-240481 | 9/1999 |
| JP | 11-257479 | 9/1999 |
| JP | 11257479 | 9/1999 |
| JP | 11317653 | 11/1999 |
| JP | 2000-6877 | 1/2000 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001234999 | 8/2001 |
| JP | 2001-328466 | 11/2001 |
| JP | 2001521109 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002291272 | 10/2002 |
| JP | 2002-372114 | 12/2002 |
| JP | 2003-028257 | 1/2003 |
| JP | 2003-56662 | 2/2003 |
| JP | 2003-507261 | 2/2003 |
| JP | 2003-161357 | 6/2003 |
| JP | 2003-194206 | 7/2003 |
| JP | 2003-194207 | 7/2003 |
| JP | 2003524119 | 8/2003 |
| JP | 2003-320987 | 11/2003 |
| JP | 2003-336732 | 11/2003 |
| JP | 2004-011834 | 1/2004 |
| JP | 2004-38722 | 2/2004 |
| JP | 2004-162652 | 6/2004 |
| JP | 2004-189222 | 7/2004 |
| JP | 2004-232776 | 8/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2007-085404 | 4/2007 |
| JP | 2007-321931 | 12/2007 |
| JP | 2007535715 | 12/2007 |
| JP | 2008-002687 | 1/2008 |
| JP | 2008-14412 | 1/2008 |
| JP | 2008014412 | 1/2008 |
| JP | 2008-133896 | 6/2008 |
| JP | 4351361 | 10/2009 |
| JP | 2010-069005 | 4/2010 |
| JP | 2010532454 | 10/2010 |
| JP | 2011178341 | 9/2011 |
| JP | 2012506001 | 3/2012 |
| JP | 4913823 | 4/2012 |
| JP | 4941536 | 5/2012 |
| JP | 2012-107725 | 6/2012 |
| JP | 2012-122568 | 6/2012 |
| JP | 2012121338 | 6/2012 |
| JP | 2012-211610 | 11/2012 |
| JP | 2012-225390 | 11/2012 |
| JP | 2012225390 | 11/2012 |
| JP | 2013521452 | 6/2013 |
| JP | 2013147245 | 8/2013 |
| JP | 5348166 | 11/2013 |
| JP | 5647231 | 12/2014 |
| JP | 5668205 | 2/2015 |
| JP | 2015505022 | 2/2015 |
| JP | 2015075148 | 4/2015 |
| JP | 2015-227690 | 12/2015 |
| JP | 2015-227691 | 12/2015 |
| JP | 5865361 | 2/2016 |
| JP | 5969565 | 8/2016 |
| JP | 6131754 | 5/2017 |
| JP | 6153423 | 6/2017 |
| JP | 6275170 | 2/2018 |
| JP | 2018025315 | 2/2018 |
| KR | 2002 0054126 | 7/2002 |
| KR | 10-2002-0071699 | 9/2002 |
| KR | 20080079274 | 8/2008 |
| KR | 20080081030 | 9/2008 |
| KR | 20130018976 | 2/2013 |
| KR | 101339282 | 1/2014 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 401496 | 8/2000 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| TW | 200741116 | 11/2007 |
| TW | 200821218 | 5/2008 |
| TW | 201339049 | 10/2013 |
| WO | WO 99/08024 | 2/1999 |
| WO | WO 99/20918 | 4/1999 |
| WO | 2000061388 | 10/2000 |
| WO | WO 01/73319 | 10/2001 |
| WO | 2002088573 | 11/2002 |
| WO | 2003086849 | 10/2003 |
| WO | WO 03/100294 | 12/2003 |
| WO | 2004079223 | 9/2004 |
| WO | 2005019669 | 3/2005 |
| WO | WO 05/083305 | 9/2005 |
| WO | WO 05/108825 | 11/2005 |
| WO | WO 05/111472 | 11/2005 |
| WO | 2006014617 | 2/2006 |
| WO | 2006047887 | 5/2006 |
| WO | WO 06/091503 | 8/2006 |
| WO | 2007061993 | 5/2007 |
| WO | 2007070167 | 6/2007 |
| WO | 2007077502 | 7/2007 |
| WO | 2008002457 | 1/2008 |
| WO | 2008057507 | 5/2008 |
| WO | WO 08/078047 | 7/2008 |
| WO | 2008095116 | 8/2008 |
| WO | 2008100792 | 8/2008 |
| WO | 2008101070 | 8/2008 |
| WO | 2008131353 | 10/2008 |
| WO | 2008154437 | 12/2008 |
| WO | 2009006481 | 1/2009 |
| WO | 2009148461 | 12/2009 |
| WO | 2009157920 | 12/2009 |
| WO | 2010017242 | 2/2010 |
| WO | 2010024809 | 3/2010 |
| WO | 2010044778 | 4/2010 |
| WO | WO 10/073036 | 7/2010 |
| WO | 2010094515 | 8/2010 |
| WO | WO 10/135407 | 11/2010 |
| WO | WO 11/064572 | 6/2011 |
| WO | WO 11/101991 | 8/2011 |
| WO | 2011124415 | 10/2011 |
| WO | WO 11/121743 | 10/2011 |
| WO | 2011138175 | 11/2011 |
| WO | WO 12/030213 | 3/2012 |
| WO | WO 13/042226 | 3/2013 |
| WO | 2013112408 | 8/2013 |
| WO | WO 14/186732 | 11/2014 |
| WO | 2016022553 | 2/2016 |

(56) References Cited

FOREIGN PATENT DOCUMENTS

| WO | WO 16/062461 | 4/2016 |
|---|---|---|
| WO | 2016079620 | 5/2016 |
| WO | 2017186911 | 11/2017 |

OTHER PUBLICATIONS

Examination report dated Jul. 11, 2018 in Indian Patent Application No. 2060/KOLNP/2010.
International Search Report and Written Opinion dated Apr. 16, 2008, for PCT Application No. PCT/US2007/023315.
International Search Report and Written Opinion dated Feb. 2, 2010 from International Patent Application No. PCT/US2008/068929, filed on Jan. 7, 2008.
International Search Report and Written Opinion dated Jan. 25, 2010 from International Patent Application No. PCT/US2009/052761, filed on Aug. 4, 2009.
International Search Report and Written Opinion dated Jul. 21, 2017 in PCT/US2017/032023.
International Search Report and Written Opinion dated Jun. 27, 2017 in PCT/US2016/063880.
International Search Report and Written Opinion dated Nov. 13, 2009 from International Patent Application No. PCT/US2008/053951, filed on Feb. 14, 2008.
International Search Report for International Application No. PCT/US2007/023315 dated Apr. 16, 2008.
International Search Report for International Application No. PCT/US2006/039166 dated Feb. 27, 2007.
Notification of Reasons for Rejection dated Oct. 6, 2020 in Japanese Patent Application No. 2018-536480, 21 pages.
Notification of the First Office Action dated Jun. 26, 2019 in Chinese Patent Application No. 201680080281.3.
Notification of the Second Office Action dated Mar. 16, 2020 in Chinese Patent Application No. 201680080281.3, 15 pages.
Office Action dated Apr. 2, 2014 in U.S. Appl. No. 13/288,711.
Office Action dated Aug. 29, 2013 in U.S. Appl. No. 13/288,711.
Office Action dated Aug. 3, 2015 in U.S. Appl. No. 14/541,875.
Office Action dated Dec. 12, 2011 for U.S. Appl. No. 12/271,611.
Office Action dated Dec. 12, 2016 in U.S. Appl. No. 13/938,056.
Office Action dated Dec. 29, 2017 in U.S. Appl. No. 14/839,567.
Office Action dated Jan. 18, 2017 in U.S. Appl. No. 14/529,773.
Office Action dated Jan. 20, 2012 for U.S. Appl. No. 12/137,456.
Office Action dated Jan. 20, 2015 in U.S. Appl. No. 13/682,176.
Office Action dated Jul. 16, 2012 for U.S. Appl. No. 12/271,611.
Office Action dated Jul. 18, 2016 in U.S. Appl. No. 13/938,056.
Office Action dated Jul. 5, 2017 in U.S. Appl. No. 14/529,773.
Office Action dated Jul. 6, 2016 in U.S. Appl. No. 14/529,773.
Office Action dated Jun. 19, 2014 in U.S. Appl. No. 13/682,176.
Office Action dated Jun. 8, 2018 in U.S. Appl. No. 14/839,567.
Office Action dated Mar. 14, 2012 for U.S. Appl. No. 12/137,480.
Office Action dated Mar. 18, 2010 from U.S. Appl. No. 12/137,464.
Office Action dated Mar. 5, 2015 in U.S. Appl. No. 14/541,875.
Office Action dated May 17, 2012 for U.S. Appl. No. 12/159,688.
Office Action dated Nov. 14, 2012 for U.S. Appl. No. 12/159,688.
Office Action dated Nov. 14, 2017 in U.S. Appl. No. 15/172,031, 5 pages.
Office Action dated Nov. 2017 in U.S. Appl. No. 14/996,743, 10 pages.
Office Action dated Sep. 15, 2010 for U.S. Appl. No. 11/543,311.
Thomassy, Fernand A., "An Engineering Approach to Simulating Traction EHL", CVT—Hybrid International Conference Mecc/Maastricht/The Netherlands, Nov. 17-19, 2010, p. 97.

* cited by examiner

FIG. 1B
|     | C1 | C2 | C3 | C4 |
|-----|----|----|----|----|
| M1  | X  |    |    |    |
| S12 | X  | X  |    |    |
| M2  |    | X  |    |    |
| S23 |    | X  | X  |    |
| M3  |    |    | X  |    |
| S34 |    |    | X  | X  |
| M4  |    |    |    | X  |
FIG. 1E
|     | C1 | C2 | C3 | C4 |
|-----|----|----|----|----|
| M1  | X  |    |    |    |
| S12 | X  | X  |    |    |
| M2  |    | X  |    |    |
| S23 |    | X  | X  |    |
| M3  |    |    | X  |    |
| S34 |    |    | X  | X  |
| M4  |    |    |    | X  |
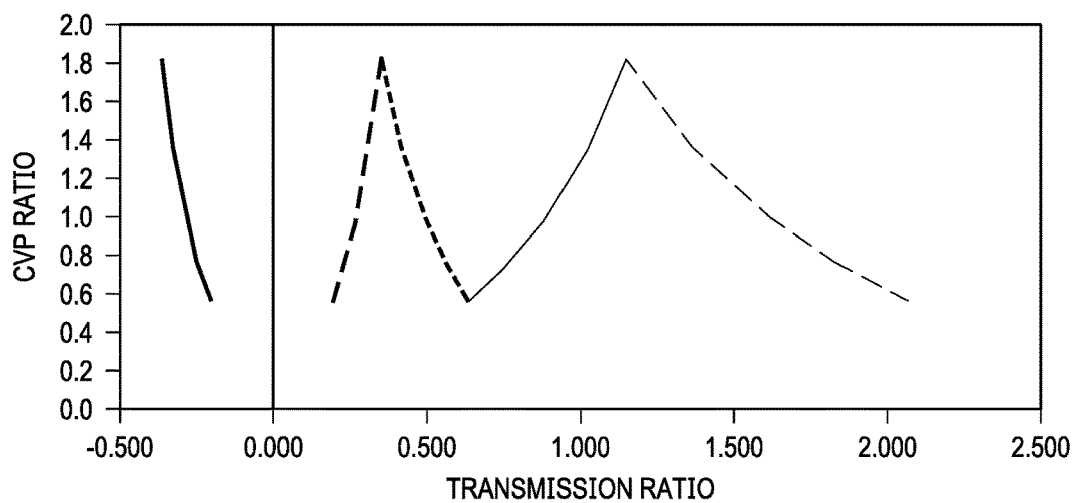
FIG. 1C
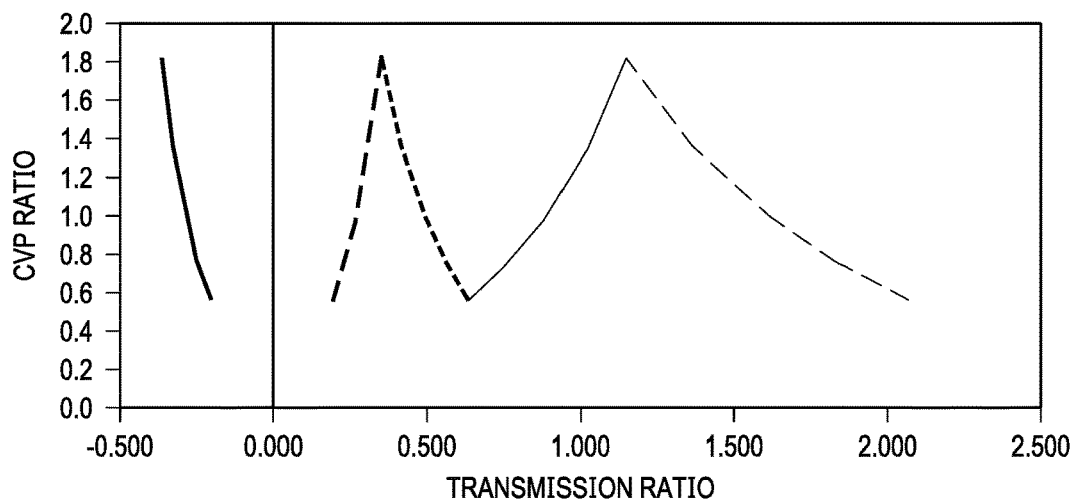
FIG. 1F

|     | CIVT | C1 | C2 | C3 | C4 | CFWD |
|-----|------|----|----|----|----|------|
| IVT | X    |    |    |    | X  |      |
| M1  |      | X  |    |    |    | X    |
| S12 |      | X  | X  |    |    | X    |
| M2  |      |    | X  |    |    | X    |
| S23 |      |    | X  | X  |    | X    |
| M3  |      |    |    | X  |    | X    |
| S34 |      |    |    | X  | X  | X    |
| M4  |      |    |    |    | X  | X    |

|     | CIVT | C1 | C2 | C3 | C4 | CFWD |
|-----|------|----|----|----|----|------|
| IVT | X    | X  |    |    |    |      |
| M1  |      | X  |    |    |    | X    |
| S12 |      | X  | X  |    |    | X    |
| M2  |      |    | X  |    |    | X    |
| S23 |      |    | X  | X  |    | X    |
| M3  |      |    |    | X  |    | X    |
| S34 |      |    |    | X  | X  | X    |
| M4  |      |    |    |    | X  | X    |

CONTINUOUSLY VARIABLE TRANSMISSIONS, SYNCHRONOUS SHIFTING, TWIN COUNTERSHAFTS AND METHODS FOR CONTROL OF SAME

CROSS-REFERENCE TO RELATED APPLICATIONS

This application claims the benefit of U.S. Provisional Patent Application No. 62/756,478, filed on Nov. 6, 2018, entitled "CONTINUOUSLY VARIABLE TRANSMISSIONS AND SYNCHRONOUS SHIFT TWIN COUNTERSHAFTS AND METHODS FOR CONTROL OF SAME," the contents of which are hereby incorporated by reference herein.

BACKGROUND

Field of the Disclosure

The present disclosure relates generally to mechanical power transmission, and more particularly to continuously variable transmissions, and for methods of synchronous shifting.

Description of the Related Art

Power transmissions of any type can also be grouped generally into three categories: manual, synchronous and non-synchronous according to how they shift. In manual transmissions, a user is responsible for depressing a clutch to release a gear, shifting the transmission and releasing the clutch to apply the new gear ratio. In non-synchronous shifting in an automatic transmission, when the transmission shifts gears, only one clutch or band is applied or released. Synchronous shifting in transmission generally refers to the coordinated and usually simultaneous application and release of two or more clutches, bands or other control mechanisms.

SUMMARY OF THE DISCLOSURE

In one broad respect, embodiments disclosed herein are directed to a drivetrain capable of synchronous shifting with a continuously variable transmission. Certain embodiments relate to a transmission having a planetary gearset for receiving rotary power from an input source, a variator, a first countershaft, a second countershaft, an output shaft receiving power from each of the first gear and the second gear, and a control system having a first clutch, a second clutch; and a controller configured to adjust the speed ratio of the variator and selectively engage the first gear or the second gear, wherein in a first mode, the control system is configured to engage the first gear on the first countershaft and adjust the variator from the first maximum speed ratio to the second maximum speed ratio to increase the transmission ratio from a first transmission ratio to a second transmission ratio, wherein in a second mode, the control system is configured to engage the second gear on the second countershaft and adjust the variator from the second maximum speed ratio to the first maximum speed ratio to increase the transmission ratio from the second transmission ratio to a third transmission ratio, and wherein changing from the first mode to the second mode comprises disengaging the first clutch from the first gear and engaging the second clutch to the second gear.

In another embodiment, in the first mode, power is transmitted through the planetary gearset and the variator according to a first power path, and in the second mode, power is transmitted through the planetary gearset and the variator according to a second power path, and changing from the first mode to the second mode includes changing a configuration of the planetary gearset.

In another embodiment, the planetary gearset is a double planetary gearset, in the first mode, power is transmitted from a first set of planetary gears to the variator, in the second mode, power is transmitted from a second set of planetary gears to the variator, and changing from the first mode to the second mode includes changing from the first set of planetary gears to the second set of planetary gears. In some embodiments, changing from the first mode to the second mode includes changing a configuration of the variator. In certain embodiments, the variator comprises a ball planetary continuously variable transmission having a plurality of traction planets, and the control system is configured to change a tilt angle of the plurality of traction planets to adjust the speed ratio of the variator. In certain embodiments, the variator has a first traction ring on a first side of the plurality of traction planets, a second traction ring on a second side of the plurality of traction planets, and a sun located radially inward of the plurality of traction planets, and in a first mode, power is transferred from the first traction ring through the plurality of traction planets to one of the second traction ring or the traction sun, and in a second mode, power is transferred from the second traction ring through the plurality of traction planets to the first traction ring.

In another embodiment, the transmission also includes a third gear associated with the first countershaft, a third clutch corresponding to the third gear, a fourth gear associated with the second countershaft, and a fourth clutch corresponding to the fourth gear, and in a third mode, the control system engages the third gear on the first countershaft and adjusts the variator from the first maximum speed ratio to the second maximum speed ratio to increase the transmission ratio from the third transmission ratio to a fourth transmission ratio, and in a fourth mode, the control system engages the fourth gear on the second countershaft and adjusts the variator from the second maximum speed ratio to the first maximum speed ratio to increase the transmission ratio from the fourth transmission ratio to a fifth transmission ratio, and changing from the second mode to the third mode includes disengaging the second clutch from the second gear and engaging the third clutch to the third gear, and changing from the third mode to the fourth mode includes disengaging the third clutch from the third gear and engaging the fourth clutch to the fourth gear. In some embodiments, the transmission includes an infinitely variable transmission (IVT) clutch, an IVT gear coupled to the first countershaft, an output planetary gearset coupled to the output shaft, and a forward clutch coupled to the output planetary gearset, and the control system can engage the forward clutch for the first mode or the second mode, and in an IVT mode, the control system engages the IVT clutch to the IVT gear and engages the fourth clutch to the fourth gear, and the control system adjusts the speed ratio of the variator to one of a positive transmission ratio, a negative transmission ratio, and a powered zero transmission ratio.

In certain embodiments, the transmission also includes an infinitely variable transmission (IVT) clutch, an IVT gear coupled to the second countershaft, an output planetary gearset coupled to the output shaft, and a forward clutch coupled to the output planetary gearset, and the control system engages the forward clutch for the first mode or the second mode, and in an IVT mode, the control system engages the IVT clutch to the IVT gear and engages the first clutch to the first gear, and the control system adjusts the speed ratio of the variator to one of a positive transmission ratio, a negative transmission ratio, and a powered zero transmission ratio, and the control system is disengages the IVT clutch from the IVT gear and engages the forward clutch to change from the IVT mode to the first mode.

In some embodiments of the transmission, the input source comprises a prime mover, and the control system comprises a prime mover controller and a plurality of sensors associated with the prime mover and the transmission, and the control system receives an input signal associated with a target output power, and adjusts one or more parameters of the prime mover and the transmission to achieve the target output power. While in certain embodiments of the transmission, the control system operates according to one of a plurality of control algorithms, and in an efficiency control algorithm, the prime mover and the transmission are controlled to operate the prime mover based on an efficiency map, and in a power control algorithm, the prime mover and the transmission are controlled to operate the prime mover based on a power map. In some cases, operating the control system in the efficiency control algorithm includes maintaining the prime mover within an operating range for input power efficiency. In certain cases, operating the control system in the power control algorithm includes adjusting the prime mover over a range of power inputs for the target output power.

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description" one will understand how the features of the system and methods provide several advantages over traditional systems and methods.

BRIEF DESCRIPTION OF THE DRAWINGS

FIG. 1B depicts a table of clutch states for configuring the embodiment depicted in FIG. 1A;

FIG. 1C depicts a graph of CVP ratio versus transmission ratio for the embodiment depicted in FIG. 1A, illustrating synchronous shifting at each shift;

FIG. 1E depicts a table of clutch states for configuring the embodiment depicted in FIG. 1D;

FIG. 1F depicts a graph of CVP ratio versus transmission ratio for the embodiment depicted in FIG. 1D, illustrating synchronous shifting at each shift;

DETAILED DESCRIPTION

Certain embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments. Furthermore, embodiments may include several novel features, no single one of which is solely responsible for its desirable attributes or which is essential to practicing the systems and methods herein described. The CVT/IVT embodiments described herein are generally related to types of CVT/IVT transmissions and variators known as continuously variable planetary drives or CVP disclosed in U.S. Pat. Nos. 6,241,636, 6,419,608, 6,689,012, and 7,011,600. The entire disclosure of each of these patents is hereby incorporated herein by reference. While CVPs are a type of CVT/IVT, the terms may be used interchangeably throughout this application, unless otherwise specifically stated in this detailed description.

For description purposes, the term "radial" is used herein to indicate a direction or position that is perpendicular relative to a longitudinal axis of a transmission or variator. The term "axial" as used herein refers to a direction or position along an axis that is parallel to a main or longitudinal axis of a transmission or variator. Certain operations described herein are intended to be executed by one or more processors or microprocessors capable of executing instructions of sufficient speed and complexity that they cannot be performed in the mind of a person. Many operations described herein are understood as requiring and providing speed, accuracy and complexity management that are not obtainable by human mental steps, in addition to the inherently digital nature of such operations (e.g., a human mind cannot interface directly with I/O module, RAM, ROM, other digital storage to search a result or generate further instructions). While this is readily understood by persons of ordinary skill in the art, others who may have need to review the disclosure of this application may from time to time need to be instructed, informed, or reminded of such facts.

Figure 1A:
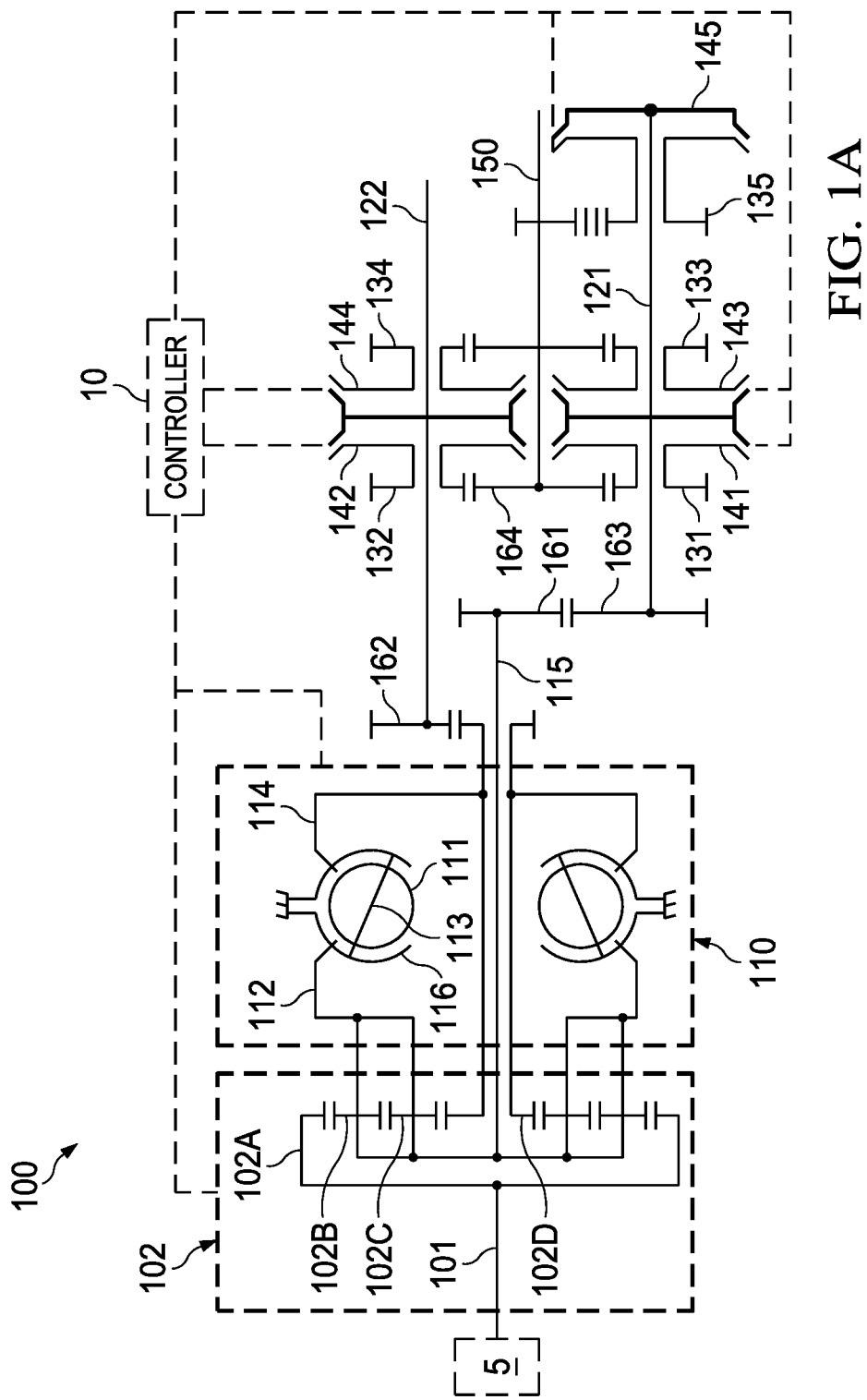
FIG. 1A depicts a schematic diagram, illustrating a layout of one embodiment of a drivetrain capable of synchronous shifting between modes.

A drivetrain with a ball-planetary continuously variable transmission allows for continuous speed ratios over a range of transmission ratios. In an embodiment depicted in FIG. 1A, transmission 100 includes input shaft 101 for receiving power from prime mover 5, planetary gear set 102, CVT 110, first countershaft 121 associated with first gear 131 and third gear 133 and second countershaft 122 associated with second gear 132 and fourth gear 134, and output shaft 150 configured to receive power from either first countershaft 121 or second countershaft 122. For example, one embodiment may have the following gear ratios. First gear 131 and second gear 132 may be −0.0504:1, reverse gear 135, may be 0.504:1, third gear 133 and fourth gear may be −1.632:1, while input gearing to the first countershaft 121 may be −0.556:1, and input planetary gear 102 may have a sun to ring ratio of 0.5.

Figure 1D:
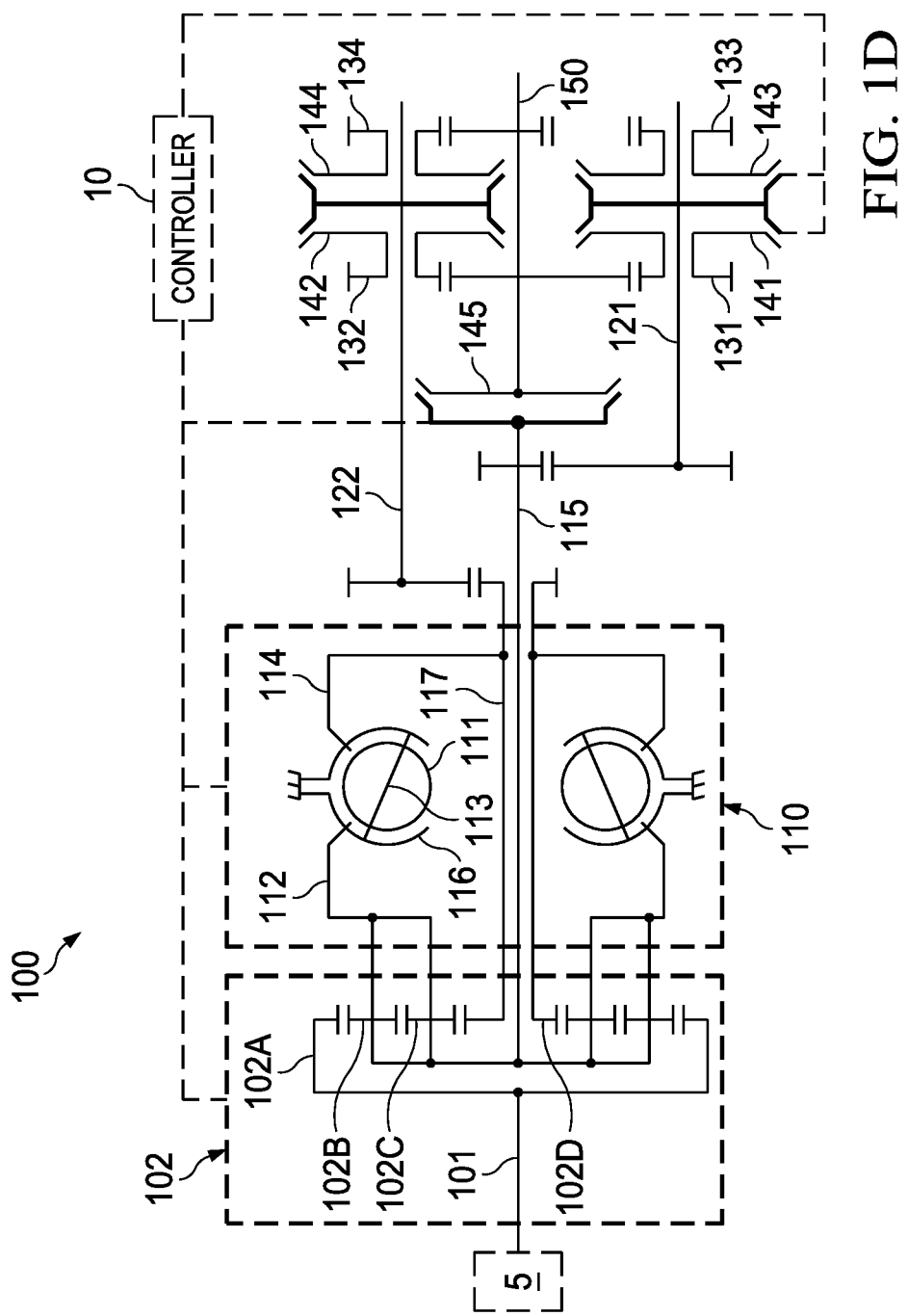
FIG. 1D depicts a schematic diagram, illustrating an alternative layout of one embodiment of a drivetrain capable of synchronous shifting between modes.

In an alternative embodiment depicted in FIG. 1D, transmission 100 includes input shaft 101 for receiving power from prime mover 5, planetary gear set 102, CVT 110, first countershaft 121 associated with first gear 131 and third gear 133 and second countershaft 122 associated with second gear 132 and fourth gear 134, and output shaft 150 configured to receive power from either first countershaft 121 or second countershaft 122.

Planetary gearset 102 is configured for receiving power from input shaft 101 and splitting the power between two power paths. In some embodiments, planetary gearset 102 is a double planetary gearset having ring gear 102A, first planetary gears 102B, second planetary gears 102C and sun gear 102D. Planetary gearset 102 may be configured with first planetary gears 102B coupled to CVT 110 such that a portion of the power received from input shaft 101 is transferred along a first power path to CVT 110 to thru shaft 117 and back through sun gear 102D to second planetary gears 102C, and further configured with second planetary gears 102C coupled to thru shaft 115 such that a portion of power received from input shaft 101 is transferred along a second power path to thru shaft 115 without transferring through CVT 110. CVT 110 is capable of modulating power between a first maximum speed ratio and a second maximum speed ratio.

In some embodiments, CVT 110 is a ball-planetary continuously variable transmission (CVP) comprising a plurality of traction planets 111 interposed between first traction ring 112 and second traction ring 114 and located radially outward of a traction sun (not shown). In some embodiments, an input power may be received by first traction ring 112 and transferred across traction planets 111 to second traction ring 114 or the traction sun. A speed ratio of CVT 110 may be determined by tilting the plurality of traction planets 111, such as by tilting axles 113 attached to planets 111. Axles 113 may be tilted to any angle between a first angle associated with the first maximum value and a second angle associated with the second maximum value. The first maximum value and the second maximum value depend on the direction power is transferred through CVT 110. Thus, if power is transferred from first traction ring 112 through traction planets 111 to second traction ring 114, the first angle may be associated with full underdrive and the second angle may be associated with full overdrive, whereas if power is transferred from second traction ring 114 through traction planets 111 to first traction ring 112, the first angle may be associated with full overdrive and the second angle may be associated with full underdrive.

Power transferred along the first power path may combine with power transferred along the second power path. In some embodiments. Power from the first power path and the second power path may combine at planetary gearset 102. In some embodiments, planetary gearset 102 is a double planetary gearset. The combined power may be transferred along thru shaft 115 to one of first countershaft 121 or second countershaft 122.

In a first mode or a third mode, power is transferred to first countershaft 121. In the first mode, first countershaft 121 may be coupled to first gear 131 by engaging first clutch 141 and in the third mode, countershaft 121 may be coupled to third gear 133 by engaging third clutch 143.

In a second mode or a fourth mode, power is transferred to second countershaft 122. In the second mode, second countershaft 122 may be coupled to second gear 132 by engaging second clutch 142 and in the fourth mode, countershaft 122 may be coupled to fourth gear 134 by engaging fourth clutch 144.

In a reverse mode, power is transferred to shaft 150 by engaging reverse clutch 145.

Output shaft 150 may be coupled to first countershaft 121 and second countershaft 122 such that power transferred through transmission 100 in the first mode, the third mode, or the second mode, or fourth mode (respectively), or the reverse mode is transferred to output shaft 150 for transmitting to other systems or components downstream.

A control system for transmission 100 comprises controller 10 communicatively coupled to each of first clutch 141, second clutch 142, third clutch 143 and fourth clutch 144 and reverse clutch 145. Controller 10 may be communicatively coupled to variator 110 for controlling the speed ratio of variator 110 and may be communicatively coupled to planetary gearset 102 for controlling a power path through planetary gearset 102, including controlling splitting power and controlling a direction power is transferred through variator 110.

In operation, controller 10 receives signals from sensors associated with transmission 100 and inputs from prime mover 5, a user or the environment, analyzes the received signals, and determines one of a configuration and a control algorithm for transmission 100. Controller 10 sends commands to clutches 141, 142, 143, 144, 145 to configure transmission 100 according to a first mode, a second mode, a third mode, a fourth mode, or a reverse mode. Controller 10 may also implement or determine a control algorithm for transmission 100. A control algorithm may determine when to engage and disengage clutches 141, 142, 143, 144, 145 based on engine RPM or some other condition such as prime mover speed, prime mover rate of change, power generated, power generation rate, vehicle speed, vehicle acceleration, power transferred to an accessory drive or auxiliary drive, an efficiency map or power map, or some other parameter, characteristic or data structure stored in memory (not shown but common in the field for transmission controllers).

In some embodiments, controller 10 receives an input corresponding to a transmission ratio and a power generated by prime mover 5, determines an algorithm for achieving the transmission ratio, and determines which of gears 131, 132, 133, 134 and 135 and what variator range achieves the transmission ratio. For example, one embodiment may have the following gear ratios. First gear 131 and second gear 132 may be −0.0504:1, reverse gear 135, may be 0.504:1, third gear 133 and fourth gear may be −1.632:1, while input gearing to the first countershaft 121 may be −0.556:1, and input planetary gear 102 may have a sun to ring ratio of 0.5.

FIG. 1B depicts a table of clutch states corresponding to four forward modes and a reverse mode. As depicted in FIG. 1B, a first mode corresponds to first clutch 141 engaging first gear 131, a second mode corresponds to second clutch engaging second gear 132, a third mode corresponds to third clutch 143 engaging third gear 133 and a fourth mode corresponds to fourth clutch 144 engaging fourth gear 134. A reverse mode corresponds to reverse clutch 145 engaging reverse gear 135.

Switching from first mode to second mode comprises second clutch 142 engaging second gear 132 and disengaging first clutch 141 from first gear 131. Switching from second mode to third mode comprises third clutch 143 engaging third gear 133 and disengaging second clutch 142 from second gear 132. Switching from third mode to fourth mode comprises fourth clutch 144 engaging fourth gear 134 and disengaging third clutch 143 from third gear 133. Switching from any mode to reverse mode comprises disengaging any of clutches 141, 142, 143, 144 from gear 131, 132, 133, or 134 and engaging reverse clutch 145 to reverse gear 135. As should be apparent in FIG. 1B, C1 is first clutch 141, C2 is second clutch 142, C3 is third clutch 143, and C4 is fourth clutch 144.

FIG. 1C depicts a graph of transmission ratio relative to speed ratio for a constant power input, illustrating how transmission 100 is controlled using the synchronous shifting strategy depicted in FIG. 1B to achieve a continuous range of transmission ratios using a CVT.

FIG. 1E depicts a table of clutch states corresponding to four forward modes and a reverse mode. As depicted in FIG. 1E, a first mode corresponds to first clutch 141 engaging first gear 131, a second mode corresponds to second clutch engaging second gear 132, a third mode corresponds to third clutch 143 engaging third gear 133 and a fourth mode corresponds to fourth clutch 144 engaging fourth gear 134. A reverse mode corresponds to reverse clutch 145 engaging reverse gear 135.

FIG. 1F depicts a graph of transmission ratio relative to speed ratio for a constant power input, illustrating how transmission 100 controlled using the synchronous shifting strategy depicted in FIG. 1E to achieve a continuous range of transmission ratios using a CVT 110.

Figure 2A:
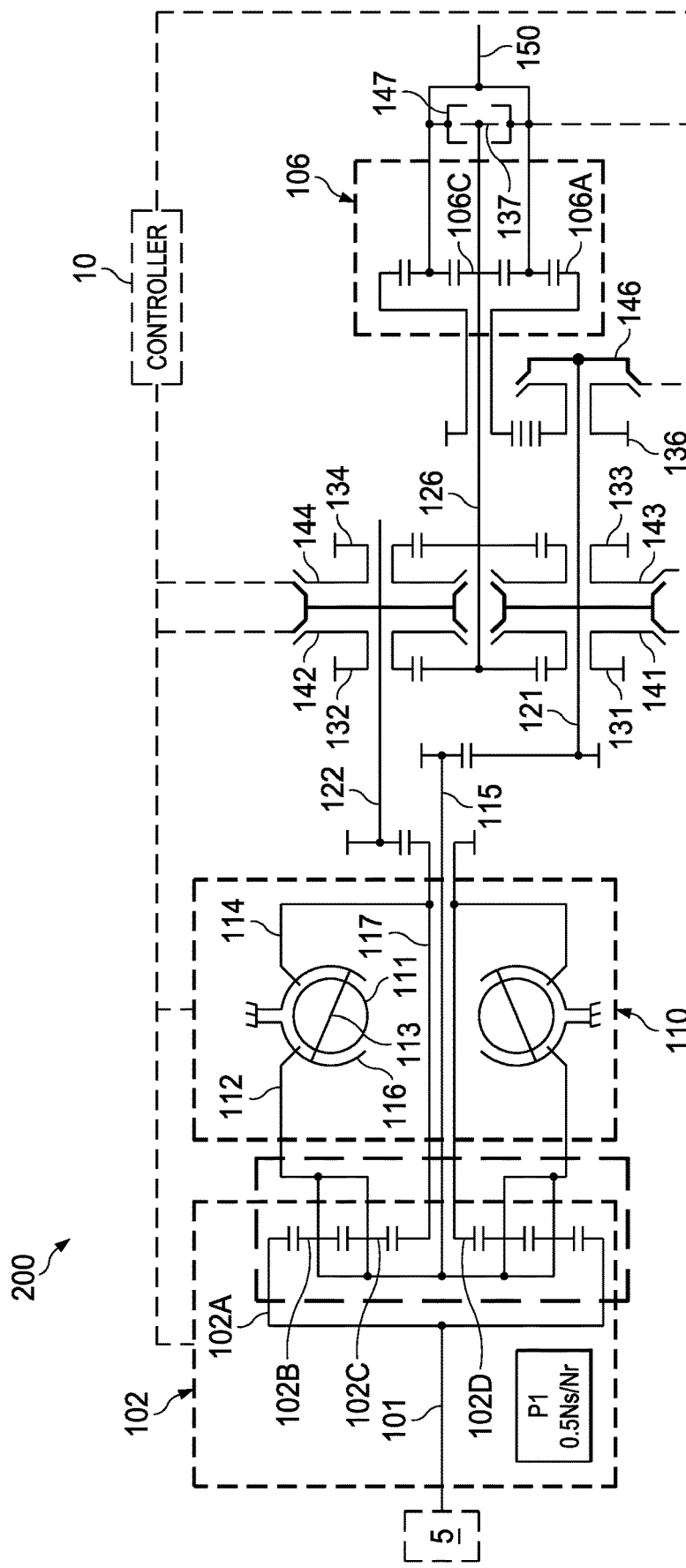
FIG. 2A depicts a schematic diagram, illustrating a layout of one embodiment of a drivetrain capable of synchronous shifting.

In an embodiment depicted in FIG. 2A, transmission 200 is coupled to prime mover 5. Power from prime mover 5 enters transmission 200 and flows through input shaft 101, planetary gear set 102, CVT 110, first countershaft 121 associated with first gear 131, third gear 133 and infinitely variable transmission (IVT) gear 136 and second countershaft 122 associated with second gear 132 and fourth gear 134, and is transmitted via intermediary shaft 126 configured to receive power from either first countershaft 121 or second countershaft 122 to second planetary gearset 106 for exiting via output shaft 150.

Planetary gearset 102 is configured for receiving power from input shaft 101 and splitting the power between two power paths. In some embodiments, planetary gearset 102 is a double planetary gearset having ring gear 102A, first planetary gears 102B, second planetary gears 102C and sun gear 102D. Planetary gearset 102 may be configured with first planetary gears 102B coupled to CVT 110 such that a portion of the power received from input shaft 101 is transferred along a first power path to CVT 110 to thru shaft 115 and back through sun gear 102D to second planetary gears 102C, and further configured with second planetary gears 102C coupled to thru shaft 115 such that a portion of power received from input shaft 101 is transferred along a second power path to thru shaft 115 without transferring through CVT 110. CVT 110 is capable of modulating power between a first maximum speed ratio and a second maximum speed ratio.

In some embodiments, CVT 110 is a ball-planetary continuously variable transmission (CVP) comprising a plurality of traction planets 111 interposed between first traction ring 112 and second traction ring 114 and located radially outward of a traction sun (not shown). In some embodiments, an input power may be received by first traction ring 112 and transferred across traction planets 111 to second traction ring 114 or the traction sun. A speed ratio of CVT 110 may be determined by tilting the plurality of traction planets 111, such as by tilting axles 113 attached to planets 111. Axles 113 may be tilted to any angle between a first angle associated with the first maximum value and a second angle associated with the second maximum value. The first maximum value and the second maximum value depend on the direction power is transferred through CVT 110. Thus, if power is transferred from first traction ring 112 through traction planets 111 to second traction ring 114, the first angle may be associated with full underdrive and the second angle may be associated with full overdrive, whereas if power is transferred from second traction ring 114 through traction planets 111 to first traction ring 112, the first angle may be associated with full overdrive and the second angle may be associated with full underdrive.

Power transferred along the first power path may combine with power transferred along the second power path. In some embodiments. Power from the first power path and the second power path may combine at planetary gearset 102. In some embodiments, planetary gearset 102 is a double planetary gearset. In certain embodiments for any of the transmissions discussed throughout this application, planetary gearset 102 includes clutches or other connections common to those of skill in the art to fix or release the carriers of first planetary gears 102B, second planetary gears 102C, or other components of the planetary gearset 102 as needed to allow power to be routed through various pathways through the planetary gearset 102 depending on the desired mode. The inclusion of such clutches or other connection types is readily apparent to those of skill in the art, but are not illustrated here in order not to complicate the drawing and because they are typical in the industry for such gearsets. The combined power may be transferred along thru shaft 115 to one of first countershaft 121 or second countershaft 122.

In a first mode, third mode or IVT mode, power is transferred to first countershaft 121. In the first mode, first countershaft 121 may be coupled to first gear 131 by engaging first clutch 141. In the third mode, countershaft 121 may be coupled to third gear 133 by engaging third clutch 143.

In a second mode or a fourth mode, power is transferred to second countershaft 122. In the second mode, second countershaft 122 may be coupled to second gear 132 by engaging second clutch 142 and in the fourth mode, countershaft 122 may be coupled to fourth gear 134 by engaging fourth clutch 144.

In an infinitely variable transmission (IVT) configuration, first countershaft 121 may be coupled to IVT gear 136 by engaging IVT clutch 146 and second countershaft 122 is coupled to fourth gear 134 by engaging fourth clutch 144. In an IVT mode, transmission 200 is capable of forward, reverse, and powered zero states. Power from fourth gear 134 may be transmitted along intermediary shaft 126 to output planetary gearset 106 and power from IVT gear 136 may be transmitted to output planetary gearset 106. In some embodiments, power from fourth gear 134 may be transmitted along intermediary shaft 126 to sun gear 106C of output planetary gearset 106 and power from IVT gear 136 may be transmitted to ring 106A of output planetary gearset 106. Power may exit second planetary gearset 106 to output shaft 150.

Intermediary shaft 126 may be coupled to first countershaft 121 and second countershaft 122 such that power transferred through transmission 200 in the first mode, the second mode, or the reverse mode is transferred to intermediary shaft 126 for transmitting to other systems or components downstream.

A control system for transmission 200 comprises controller 10 communicatively coupled to each of first clutch 141, second clutch 142, third clutch 143, fourth clutch 144, and IVT clutch 146. Controller 10 may be communicatively coupled to variator 110 for controlling the speed ratio of variator 110 and may be communicatively coupled to planetary gearset 102 for controlling a power path through planetary gearset 102, by use of clutches or other connections as described above, including controlling splitting power and controlling a direction power is transferred through variator 110.

In operation, controller 10 receives signals from sensors associated with transmission 200 and inputs from prime mover 5, a user or the environment, analyzes the received signals, and determines one of a configuration and a control algorithm for transmission 100. Controller 10 sends commands to clutches 141, 142, 143, 144, 146 to configure transmission 200 according to a first mode, a second mode, a third mode, a fourth mode, or an IVT mode. Controller 10 may also determine a control algorithm for transmission 200. A control algorithm may determine when to engage and disengage clutches 141, 142, 143, 144, 146 based on engine RPM or some other condition such as prime mover speed, prime mover rate of change, power generated, power generation rate, vehicle speed, vehicle acceleration, power transferred to an accessory drive or auxiliary drive, an efficiency map or power map, or some other parameter, characteristic or data structure stored in memory.

In some embodiments, controller 10 receives an input corresponding to a transmission ratio and a power generated by prime mover 5, determines an algorithm for achieving the transmission ratio, and determines which combination of gears 131, 132, 133, 134, 136 and 137 and what variator range achieves the transmission ratio.

Figures 2B, 2C:
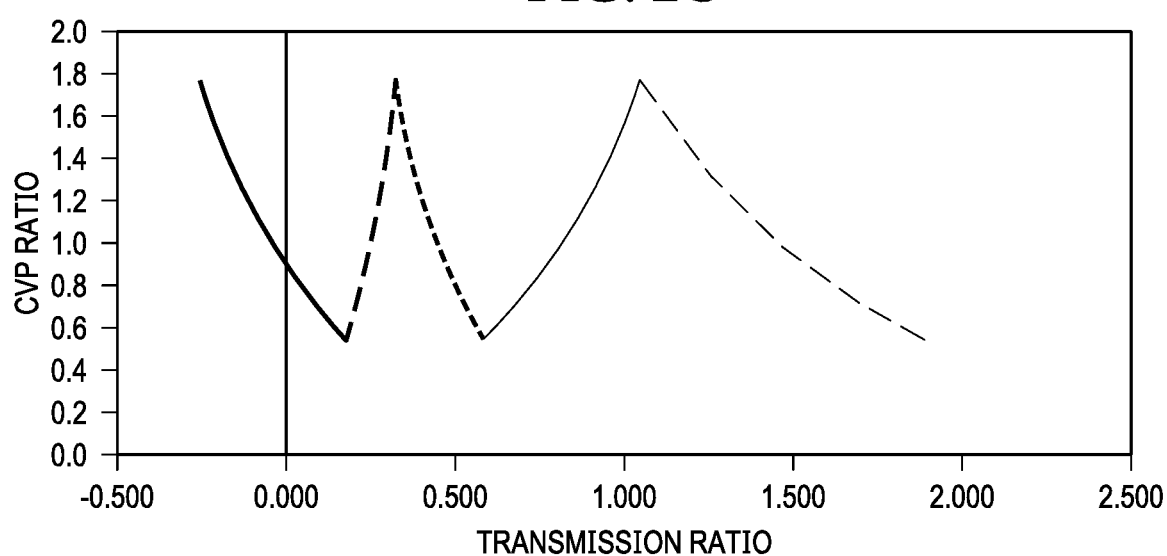
FIG. 2B depicts a table of clutch states for configuring the embodiment depicted in FIG. 2A.
FIG. 2C depicts a graph of CVP ratio versus transmission ratio for the embodiment depicted in FIG. 2A, illustrating synchronous shifting at each shift.

FIG. 2B depicts a table of clutch states corresponding to four forward modes and an IVT mode. As depicted in FIG. 2B, a first mode corresponds to first clutch 141 engaging first gear 131 and forward clutch 147 engaging forward gear 137, a second mode corresponds to second clutch 142 engaging second gear 132 and forward clutch 147 engaging forward gear 137, a third mode corresponds to third clutch 143 engaging third gear 133 and forward clutch 147 engaging forward gear 137 and a fourth mode corresponds to fourth clutch 144 engaging fourth gear 134 and forward clutch 147 engaging forward gear 137. An IVT mode corresponds to IVT clutch 146 engaging IVT gear 136 and fourth clutch 144 engaging fourth gear 134. The IVT mode is capable of forward, reverse and powered neutral states.

Switching from first mode to second mode comprises second clutch 142 engaging second gear 132 and disengaging first clutch 141 from first gear 131. Switching from second mode to third mode comprises third clutch 143 engaging third gear 133 and disengaging second clutch 142 from second gear 132. Switching from third mode to fourth mode comprises fourth clutch 144 engaging fourth gear 134 and disengaging third clutch 143 from third gear 133. Switching from IVT mode to first mode comprises disengaging IVT clutch 146 from IVT gear 136, disengaging fourth clutch 144 from fourth gear 134, engaging first clutch 141 to gear 131, and engaging forward clutch 147 to forward gear 137. As should be apparent in FIG. 2B, CIVT is IVT clutch 146, C1 is first clutch 141, C2 is second clutch 142, C3 is third clutch 143, and C4 is fourth clutch 144.

FIG. 2C depicts a graph of transmission ratio relative to CVP speed ratio for a constant power input, illustrating how transmission 200 using a CVT and controlled using the synchronous shifting strategy depicted in FIG. 2B may achieve a continuous range of transmission ratios including forward travel, reverse travel, and powered zero.

Figure 3A:
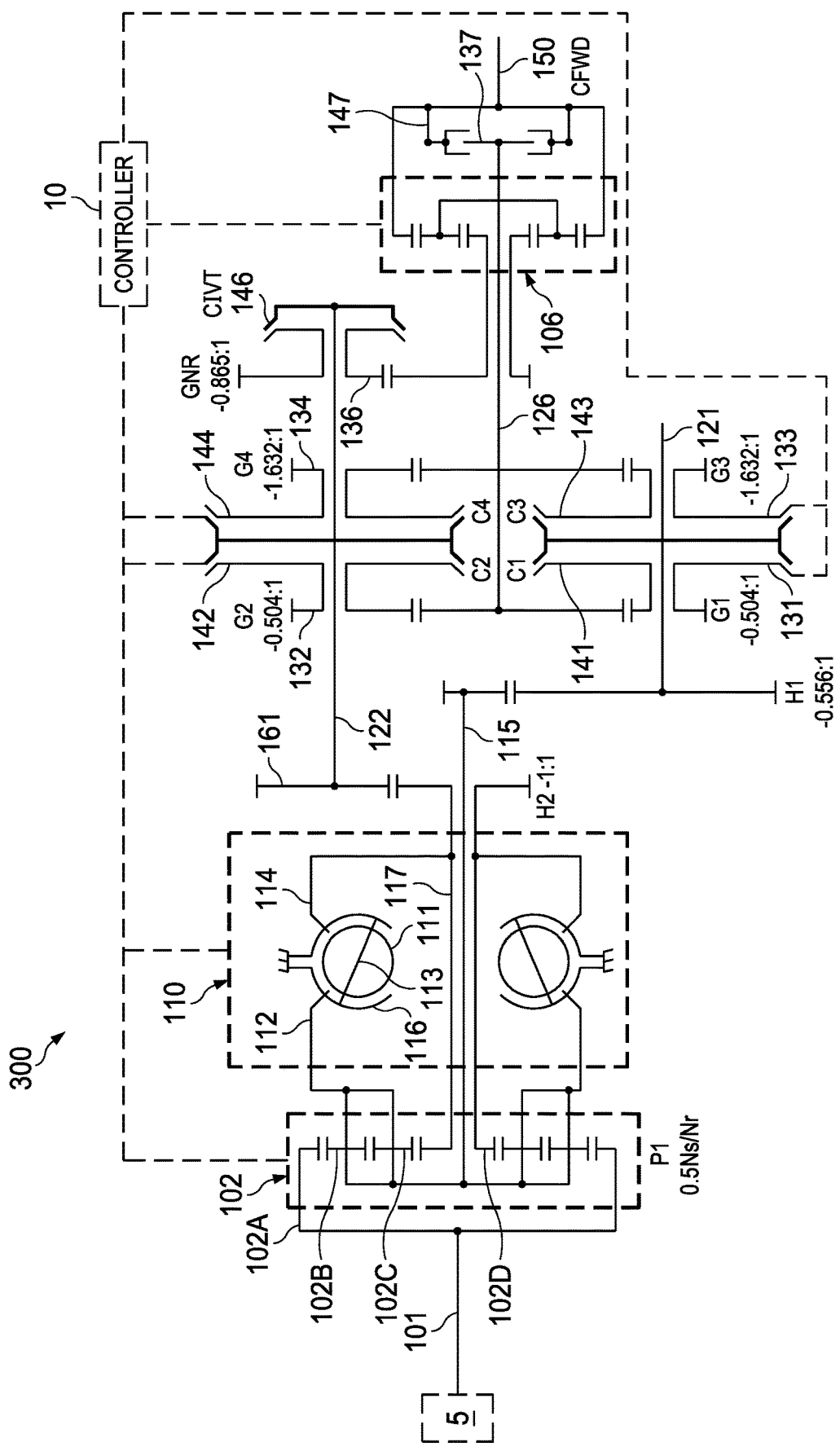
FIG. 3A depicts a schematic diagram, illustrating a layout of another embodiment of a drivetrain capable of synchronous shifting.

In an embodiment depicted in FIG. 3A, transmission 300 is coupled to prime mover 5. Power from prime mover 5 enters transmission 300 and flows through input shaft 101, planetary gear set 102, CVT 110, first countershaft 121 associated with first gear 131, and third gear 133 and second countershaft 122 associated with second gear 132, fourth gear 134, and infinitely variable transmission (IVT) gear 136, and is transmitted via intermediary shaft 126 configured to receive power from either first countershaft 121 or second countershaft 122 to second planetary gearset 106 for exiting via output shaft 150.

Planetary gearset 102 is configured for receiving power from input shaft 101 and splitting the power between two power paths. In some embodiments, planetary gearset 102 is a double planetary gearset having ring gear 102A, first planetary gears 102B, second planetary gears 102C and sun gear 102D, and clutches or connections to facilitate selection of desired power path (not shown) as discussed above. Planetary gearset 102 may be configured with first planetary gears 102B coupled to CVT 110 such that a portion of the power received from input shaft 101 is transferred along a first power path to CVT 110 to thru shaft 117 and back through sun gear 102D to second planetary gears 102C, and further configured with second planetary gears 102C coupled to thru shaft 115 such that a portion of power received from input shaft 101 is transferred along a second power path to thru shaft 115 without transferring through CVT 110. CVT 110 is capable of modulating power between a first maximum speed ratio and a second maximum speed ratio.

In some embodiments, CVT 110 is a ball-planetary continuously variable transmission (CVP) comprising a plurality of traction planets 111 interposed between first traction ring 112 and second traction ring 114 and located radially outward of a traction sun. In some embodiments, an input power may be received by first traction ring 112 and transferred across traction planets 111 to second traction ring 114 or the traction sun. A speed ratio of CVT 110 may be determined by tilting the plurality of traction planets 111, such as by tilting axles 113 attached to planets 111. Axles 113 may be tilted to any angle between a first angle associated with the first maximum value and a second angle associated with the second maximum value. The first maximum value and the second maximum value depend on the direction power is transferred through CVT 110. Thus, if power is transferred from first traction ring 112 through traction planets 111 to second traction ring 114, the first angle may be associated with full underdrive and the second angle may be associated with full overdrive, whereas if power is transferred from second traction ring 114 through traction planets 111 to first traction ring 112, the first angle may be associated with full overdrive and the second angle may be associated with full underdrive.

Power transferred along the first power path may combine with power transferred along the second power path. In some embodiments. Power from the first power path and the second power path may combine at planetary gearset 102. In some embodiments, planetary gearset 102 is a double planetary gearset. The combined power may be transferred along thru shaft 115 to one of first countershaft 121 or second countershaft 122.

In a first mode or third mode, power is transferred to first countershaft 121. In the first mode, first countershaft 121 may be coupled to first gear 131 by engaging first clutch 141. In the third mode, countershaft 121 may be coupled to third gear 133 by engaging third clutch 143.

In a second mode, a fourth mode or an IVT mode, power is transferred to second countershaft 122. In the second mode, second countershaft 122 may be coupled to second gear 132 by engaging second clutch 142. In the fourth mode, countershaft 122 may be coupled to fourth gear 134 by engaging fourth clutch 144.

In an IVT mode, second countershaft 122 may be coupled to IVT gear 136 by engaging IVT clutch 146 and first countershaft 121 is coupled to first gear 131 by engaging first clutch 141. In an IVT mode, transmission 300 is capable of forward, reverse, and powered zero states. Power from first gear 131 may be transmitted along intermediary shaft 126 to output planetary gearset 106 and power from IVT gear 136 may be transmitted to output planetary gearset 106. In some embodiments, power from first gear 131 may be transmitted along intermediary shaft 126 to sun gear 106C of output planetary gearset 106 and power from IVT gear 136 may be transmitted to sun 106D of output planetary gearset 106. Power may exit second planetary gearset 106 to output shaft 150. Exemplary gear ratios are provided in FIG. 3A, but are only meant as examples and not in any limiting manner, and those of skill in the art will appreciate that other gear ratios can be provided depending on the duty cycle of the system with design configurations being resolved through standard methodologies.

Intermediary shaft 126 may be coupled to first countershaft 121 and second countershaft 122 such that power transferred through transmission 300 in the first mode, the second mode, the third mode, the fourth mode, or the reverse mode is transferred to intermediary shaft 126 for transmitting to other systems or components downstream.

A control system for transmission 300 comprises controller 10 communicatively coupled to each of first clutch 141, second clutch 142, third clutch 143, fourth clutch 144, and IVT clutch 146. Controller 10 may be communicatively coupled to variator 110 for controlling the speed ratio of variator 110 and may be communicatively coupled to planetary gearset 102 for controlling a power path through planetary gearset 102, including controlling splitting power and controlling a direction power is transferred through variator 110.

In operation, controller 10 receives signals from sensors associated with transmission 300 and inputs from prime mover 5, a user or the environment, analyzes the received signals, and determines one of a configuration and a control algorithm for transmission 100. Controller 10 sends commands to clutches 141, 142, 143, 144, 146 to configure transmission 300 according to a first mode, a second mode, a third mode, a fourth mode, or an IVT mode. Controller 10 may also determine a control algorithm for transmission 300. A control algorithm may determine when to engage and disengage clutches 141, 142, 143, 144, 146 based on engine RPM or some other condition such as prime mover speed, prime mover rate of change, power generated, power generation rate, vehicle speed, vehicle acceleration, power transferred to an accessory drive or auxiliary drive, an efficiency map or power map, or some other parameter, characteristic or data structure stored in memory.

In some embodiments, controller 10 receives an input corresponding to a transmission ratio and a power generated by prime mover 5, determines an algorithm for achieving the transmission ratio, and determines which combination of gears 131, 132, 133, 134, 136, and 137 and what variator range achieves the transmission ratio.

Figures 3B, 3C:
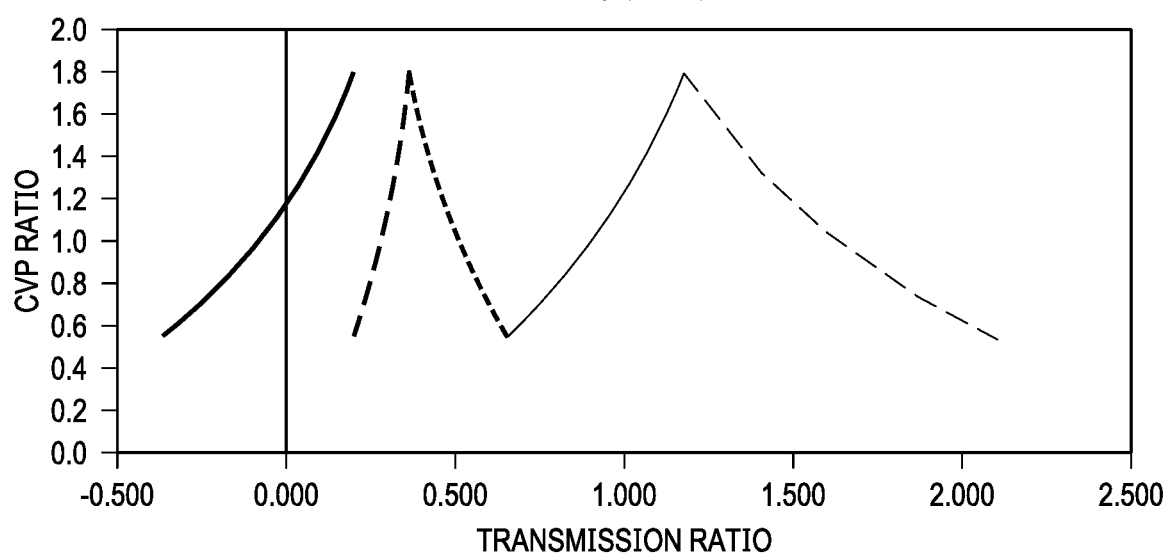
FIG. 3B depicts a table of clutch states for configuring the embodiment depicted in FIG. 3A.
FIG. 3C depicts a graph of CVP ratio versus transmission ratio for the embodiment depicted in FIG. 3A, illustrating synchronous shifting.
Figure 4A:
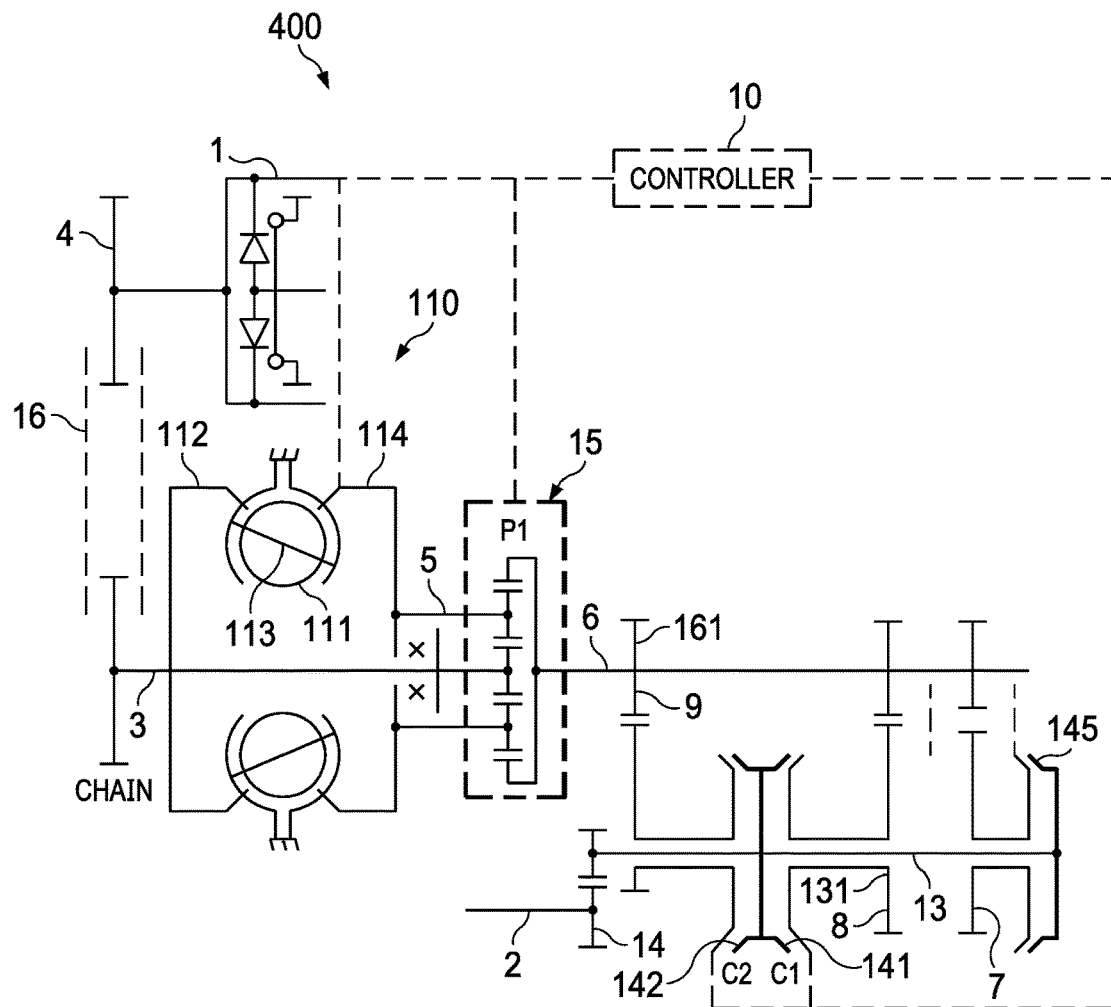
FIGS. 4A-4B, 5A-5B, 6A-6B, 7A-7B, 8A-8B, 9A-9B, 10A-10B, 11A-11B, 11C-11D, 12A-12B, 13A-13B, 14A-14B, 15A-15B, 15C-15D, 16, and 17 depict schematic and block diagrams of embodiments of a drivetrain configured for multiple forward modes and a reverse mode.
Figure 4B:
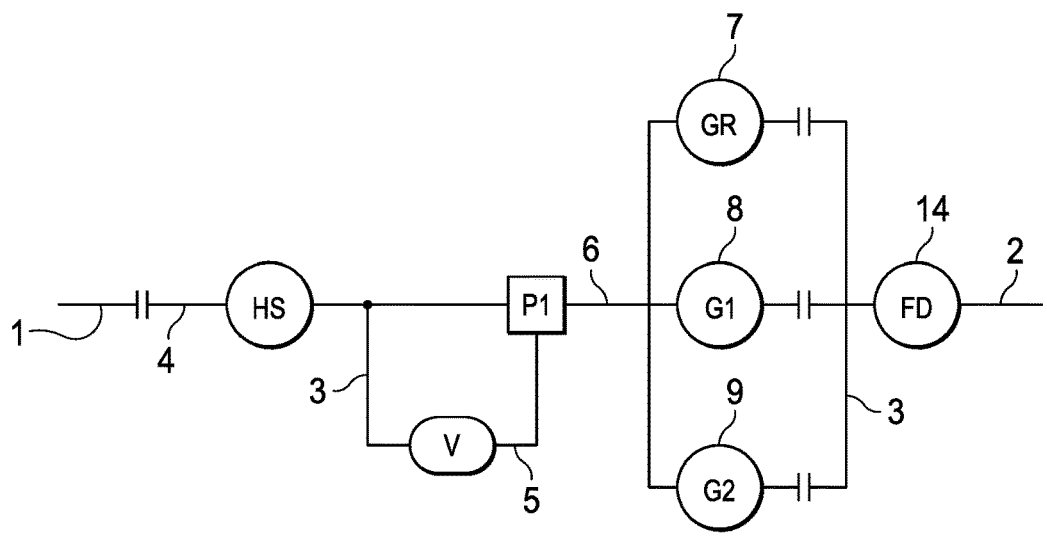
Figure 5A:
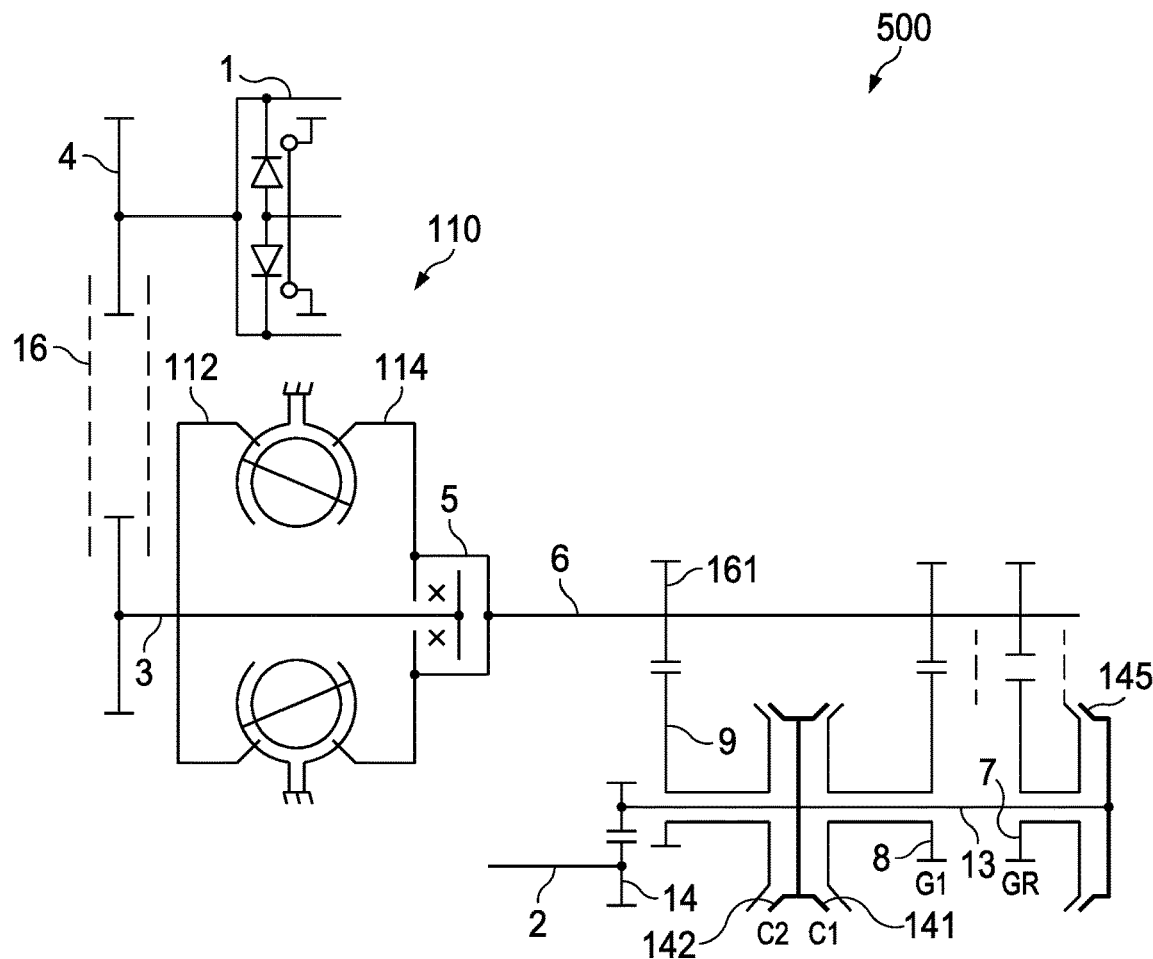
Figure 5B:
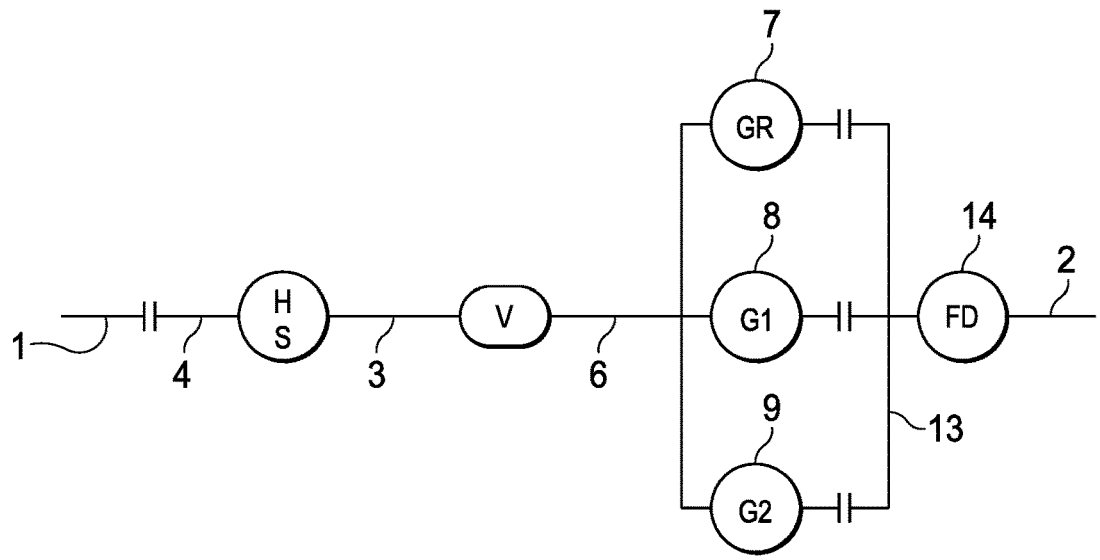

FIG. 3B depicts a table of clutch states corresponding to four forward modes and an IVT mode. As depicted in FIG. 3B, a first mode corresponds to first clutch 141 engaging first gear 131 and forward clutch 147 engaging forward gear 137, a second mode corresponds to second clutch 142 engaging second gear 132 and forward clutch 147 engaging forward gear 137, a third mode corresponds to third clutch 143 engaging third gear 133 and forward clutch 147 engaging forward gear 137 and a fourth mode corresponds to fourth clutch 144 engaging fourth gear 134 and forward clutch 147 engaging forward gear 137. An IVT mode corresponds to IVT clutch 146 engaging IVT gear 136 and first clutch 141 engaging first gear 131. The IVT mode is capable of forward, reverse and powered neutral states.

Switching from first mode to second mode comprises second clutch 142 engaging second gear 132 and disengaging first clutch 141 from first gear 131. Switching from second mode to third mode comprises third clutch 143 engaging third gear 133 and disengaging second clutch 142 from second gear 132. Switching from third mode to fourth mode comprises fourth clutch 144 engaging fourth gear 134 and disengaging third clutch 143 from third gear 133. Switching from IVT mode to first mode comprises disengaging IVT clutch 146 from IVT gear 136. As should be apparent in FIG. 3B, CIVT is IVT clutch 146, C1 is first clutch 141, C2 is second clutch 142, C3 is third clutch 143, C4 is fourth clutch 144, and CFWD is forward clutch 147.

FIG. 3C depicts a graph of transmission ratio relative to speed ratio for a constant power input, illustrating how transmission 300 using a CVT and controlled using the synchronous shifting strategy depicted in FIG. 3B may achieve a continuous range of transmission ratios including forward travel, reverse travel, and powered zero.

FIGS. 4A-4B, 5A-5B, 6A-6B, 7A-7B, 8A-8B, 9A-9B, 10A-10B, 11A-11B, 12A-12B, 13A-13B, 14A-14B, 15A-15B, 15C-15D, 16, and 17 depict schematic and block diagrams of embodiments of a drivetrain configured for multiple forward modes and a reverse mode. Each drivetrain may receive power from a prime mover, such as by input shaft 1. A drive clutch (not shown) can in some embodiments be used to allow a user to disengage a transmission from the prime mover. Power transmitted across the drive clutch to gear 4 is then transmitted by a chain drive 16 (denoted as "HS") to thru shaft 3. While a chain drive 16 is described in this embodiment, other embodiments may utilize any other mechanical transmitting element such as, for example, a shaft or gears.

Figure 9A:
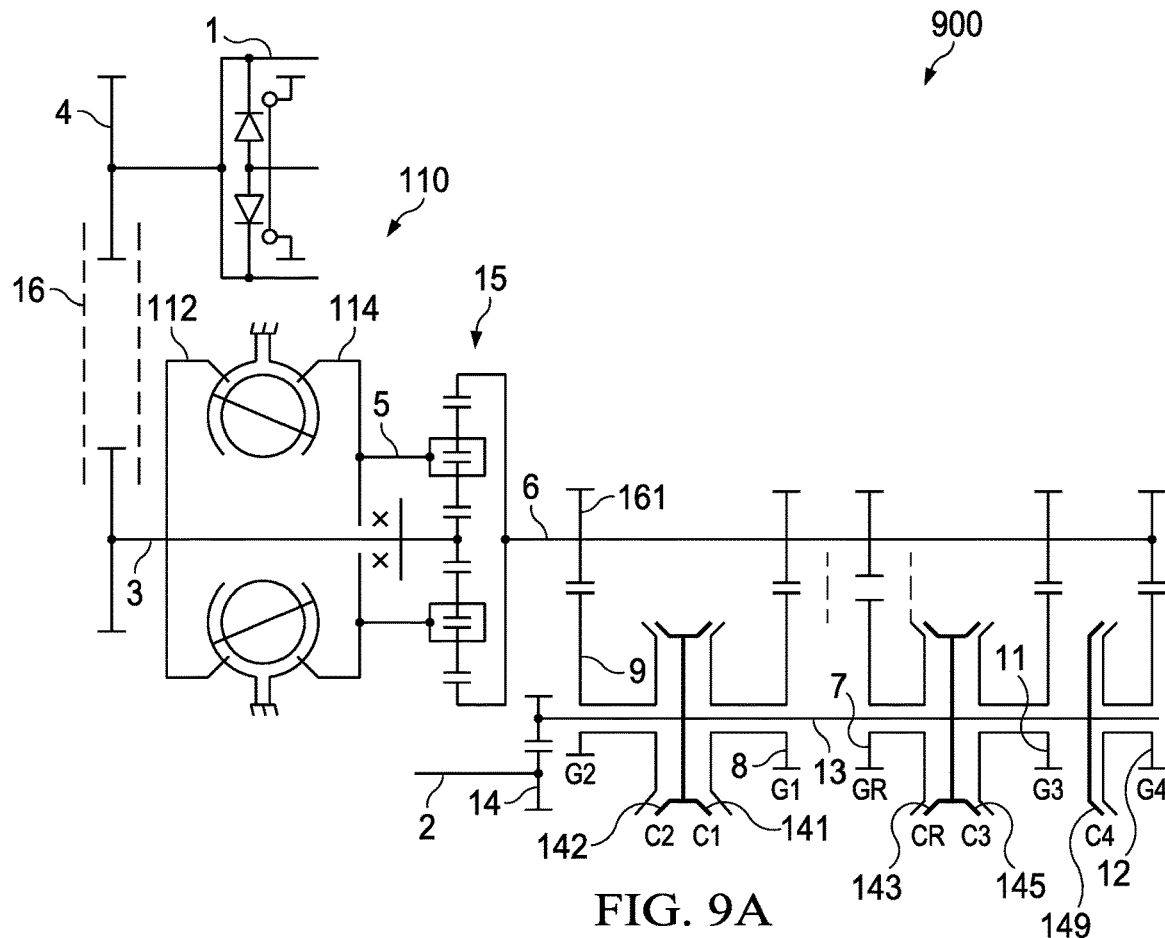
Figure 9B:
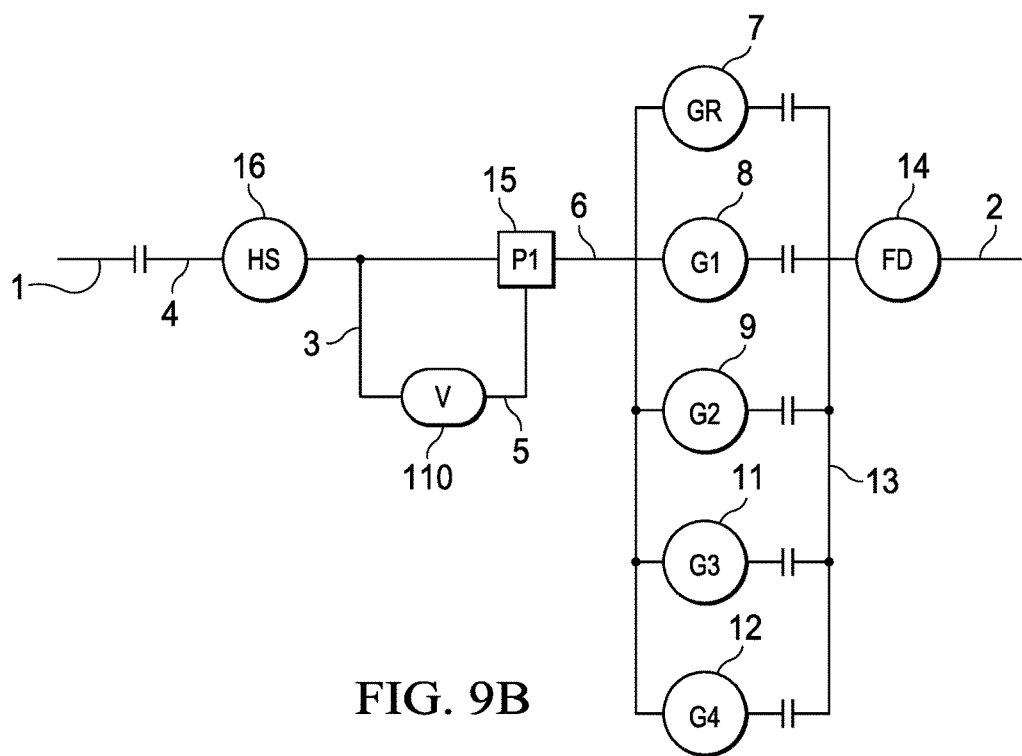
Figure 10A:
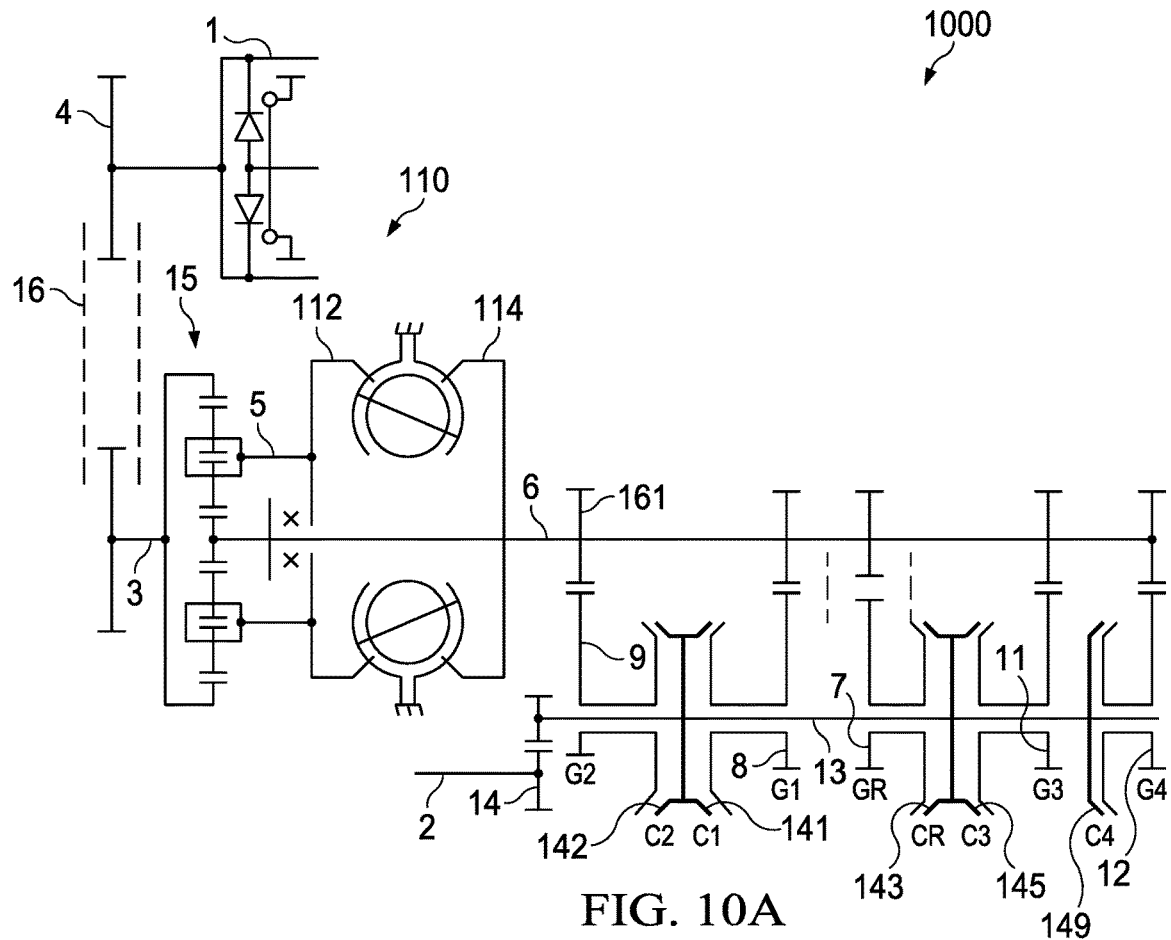
Figure 10B:
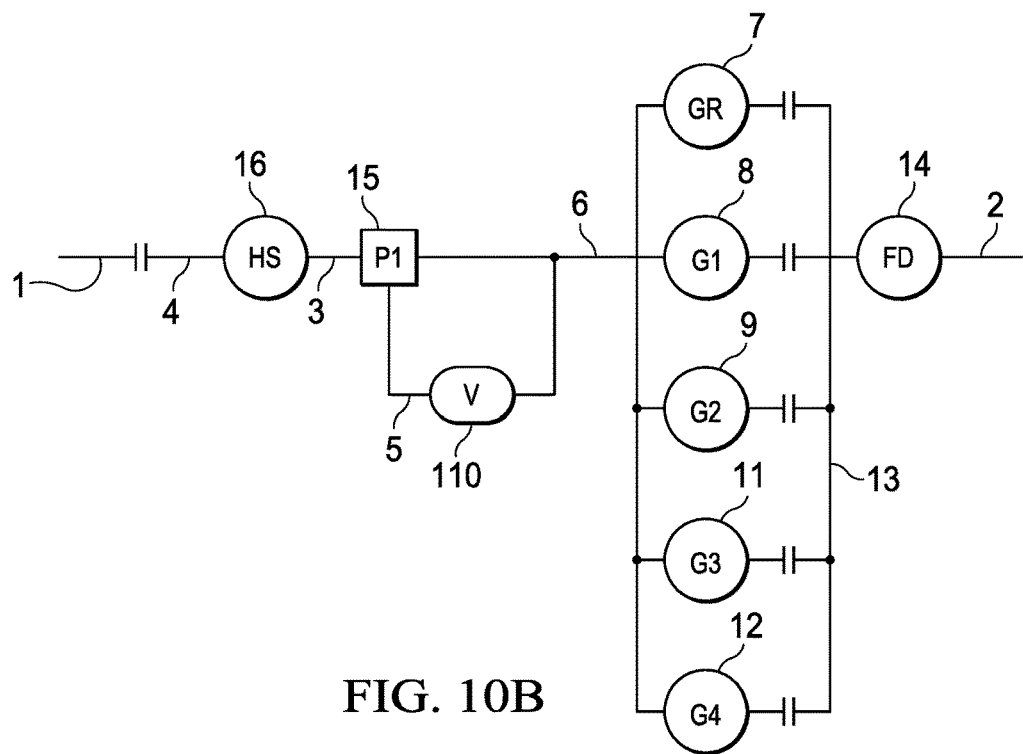
Figure 11A:
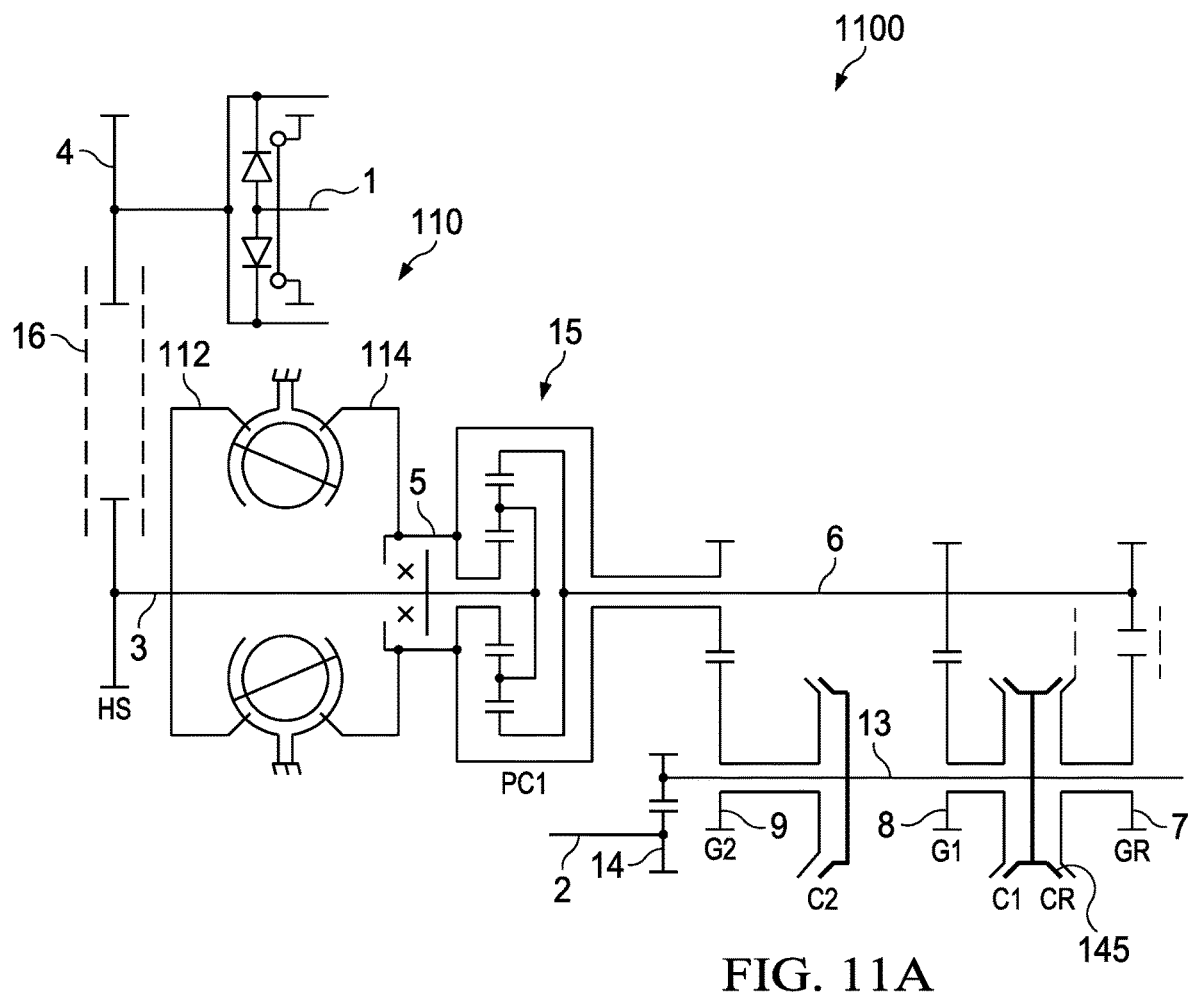
Figure 11B:
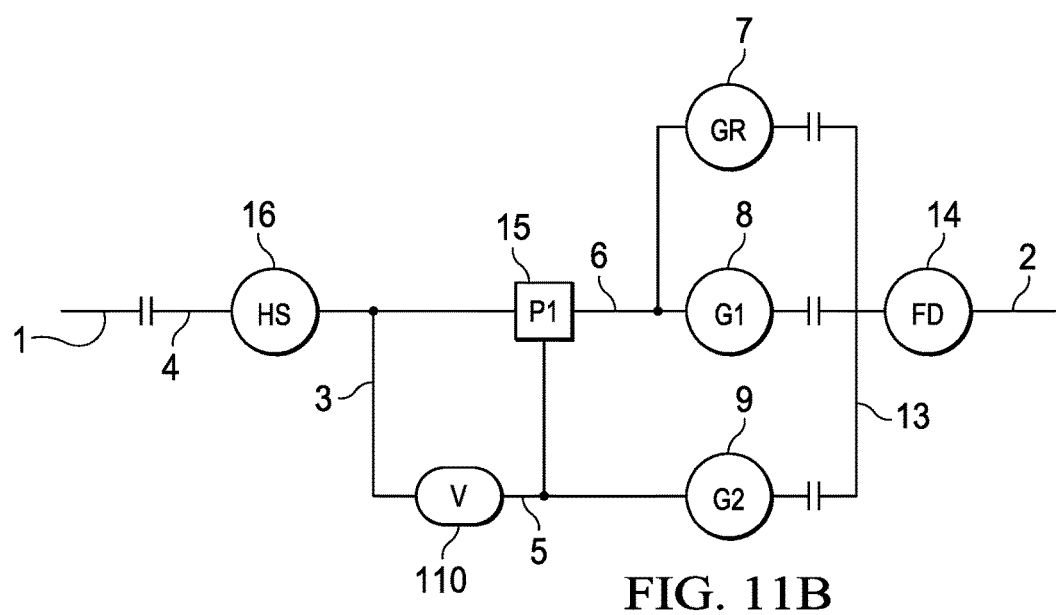
Figure 11C:
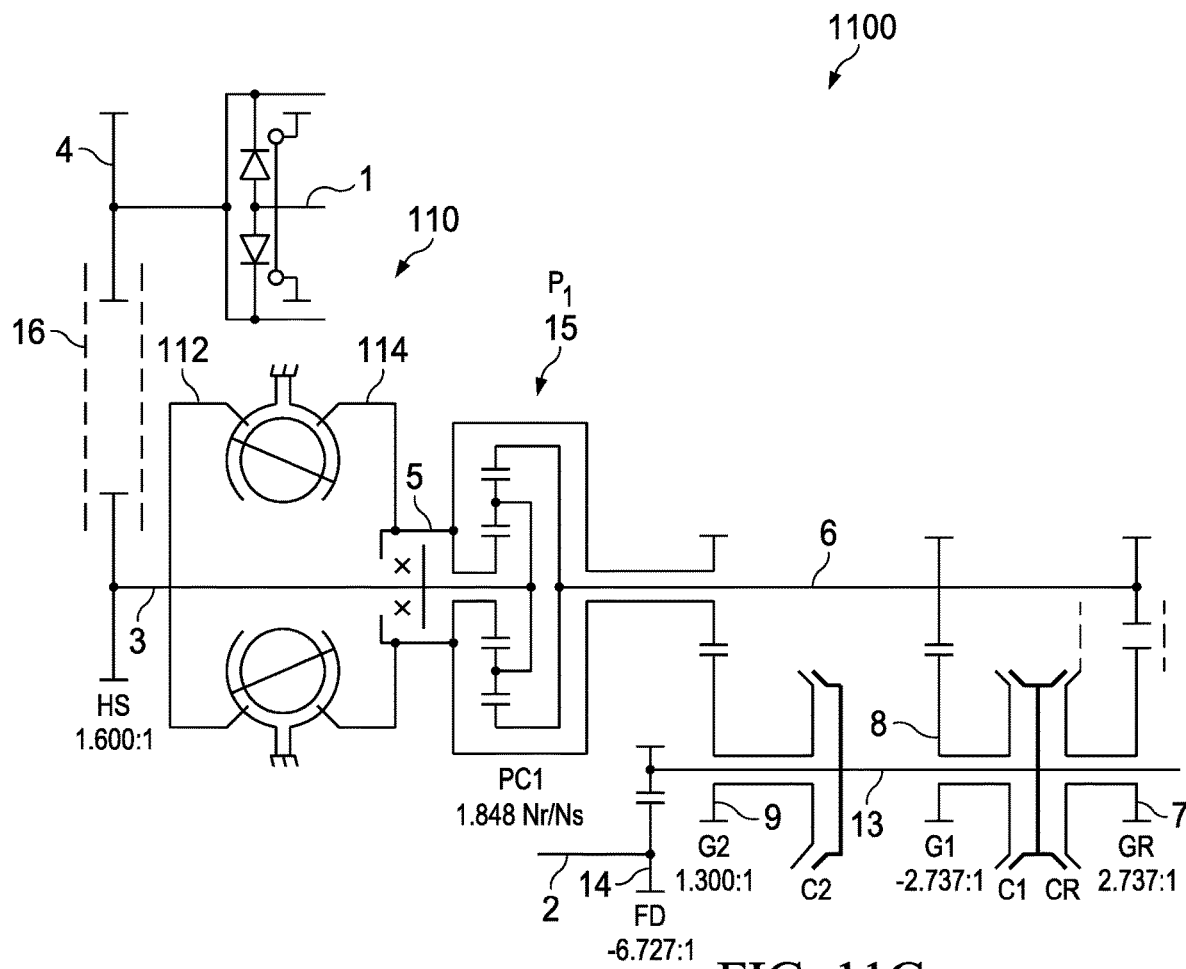
Figure 11D:
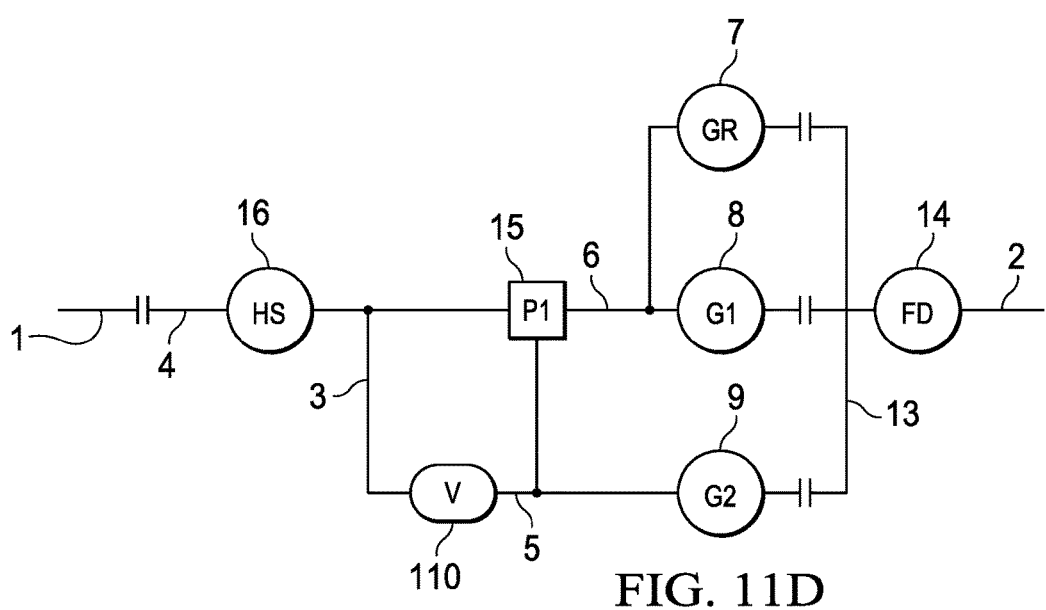
Figure 12A:
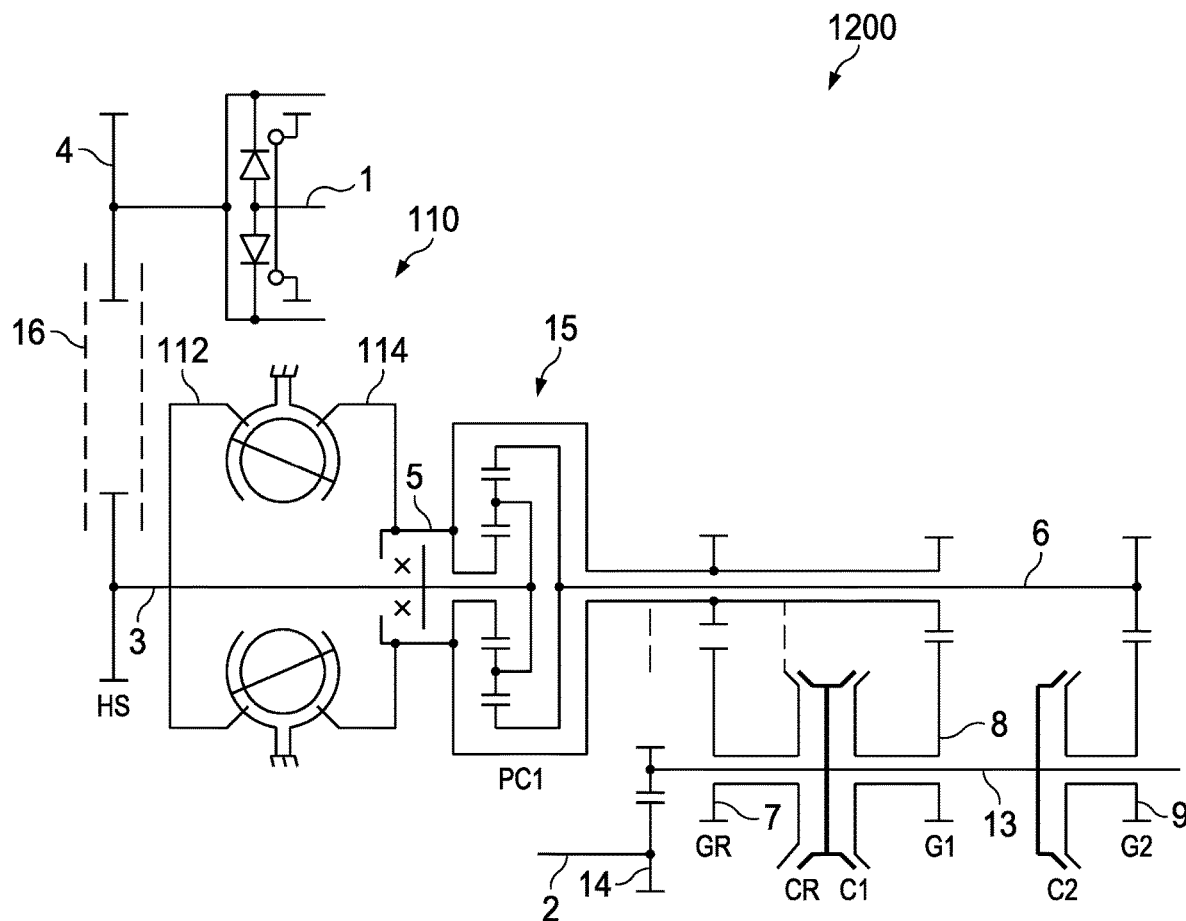
Figure 12B:
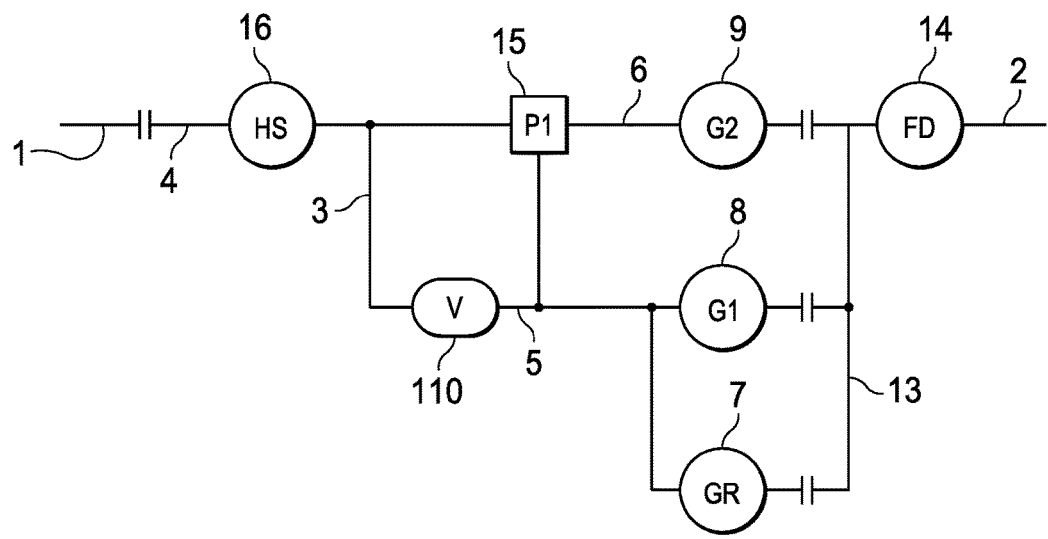
Figure 13A:
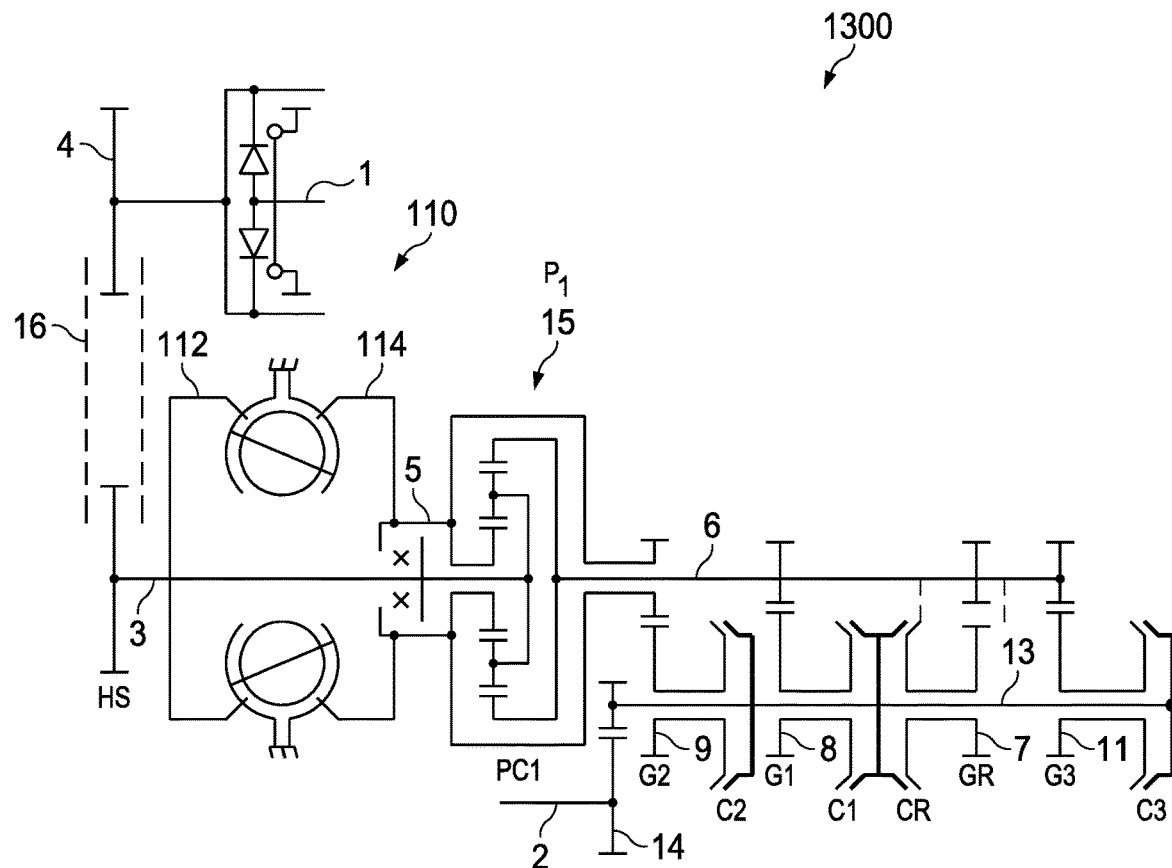
Figure 13B:
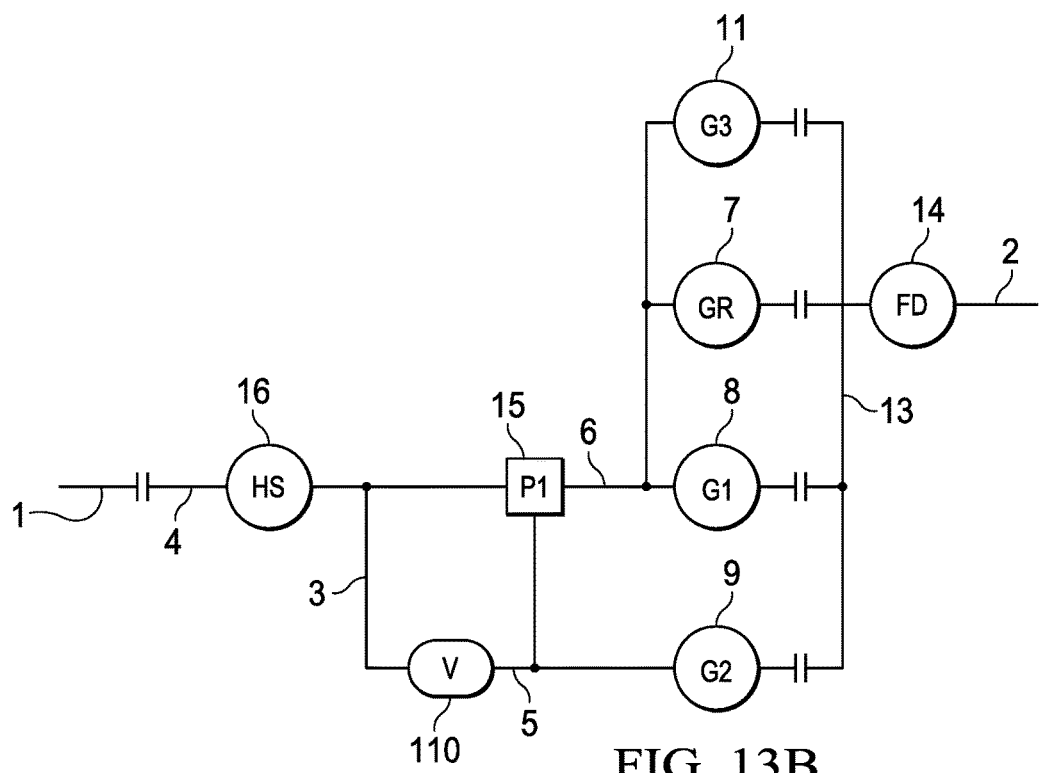
Figure 14A:
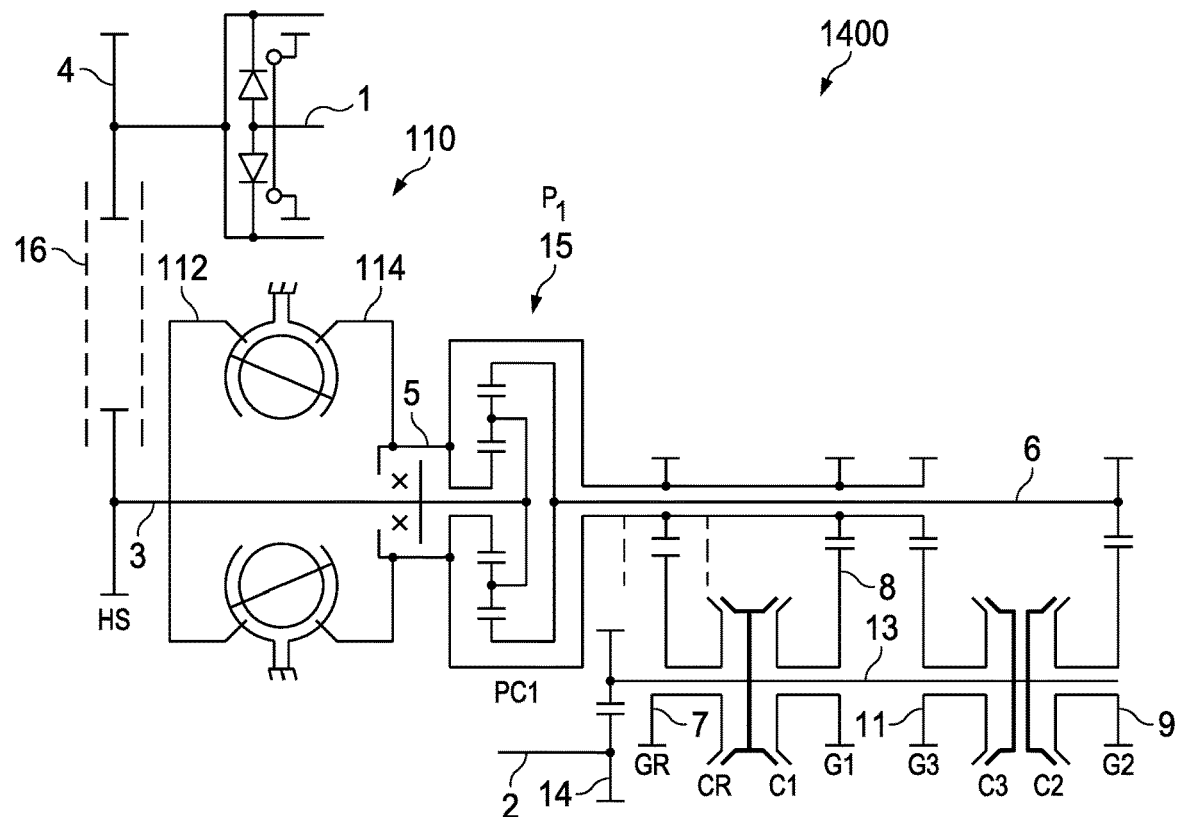
Figure 14B:
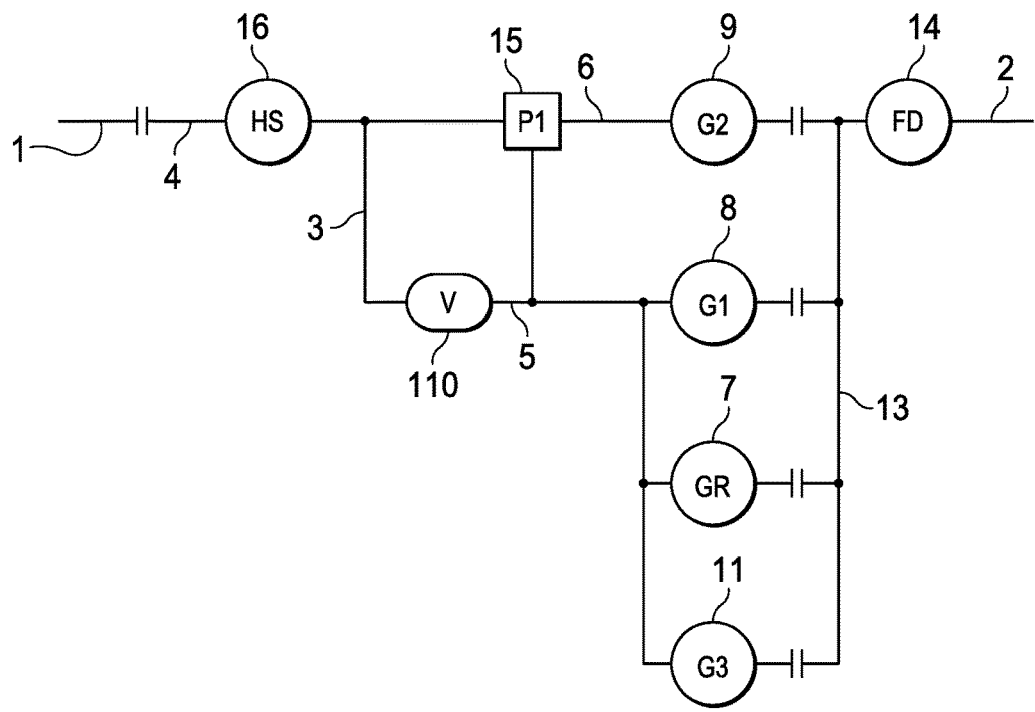
Figure 15A:
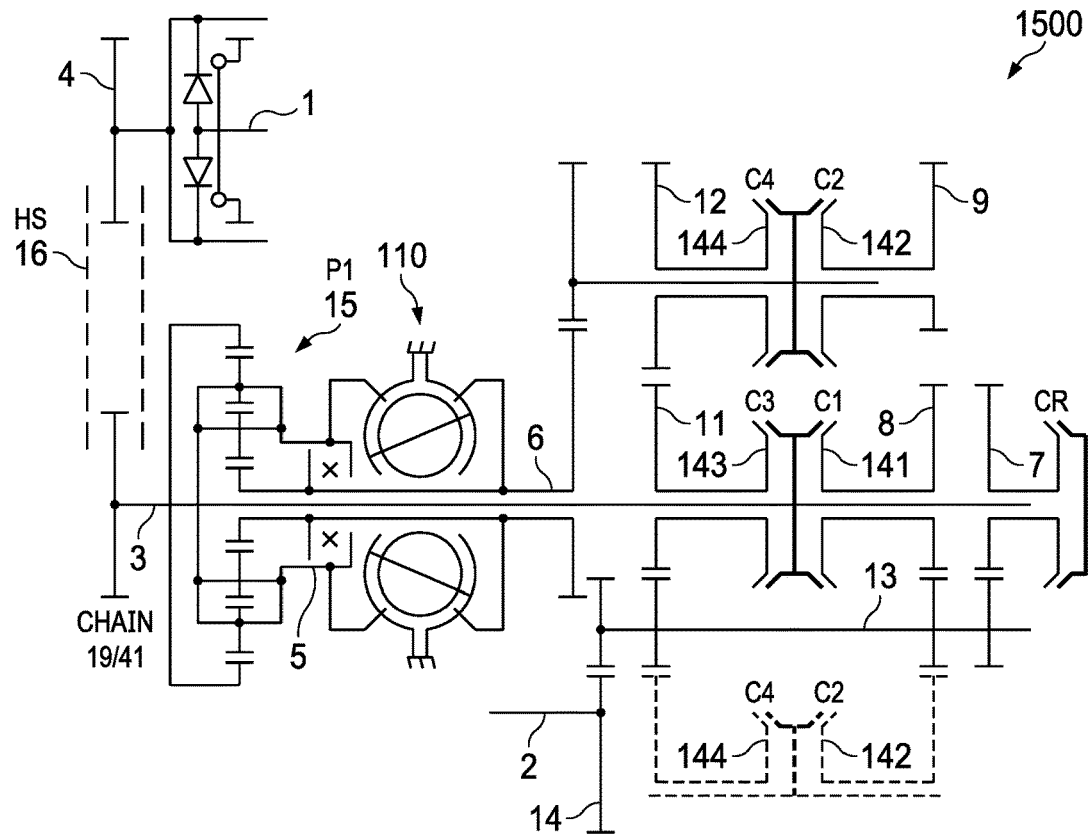
Figure 15B:
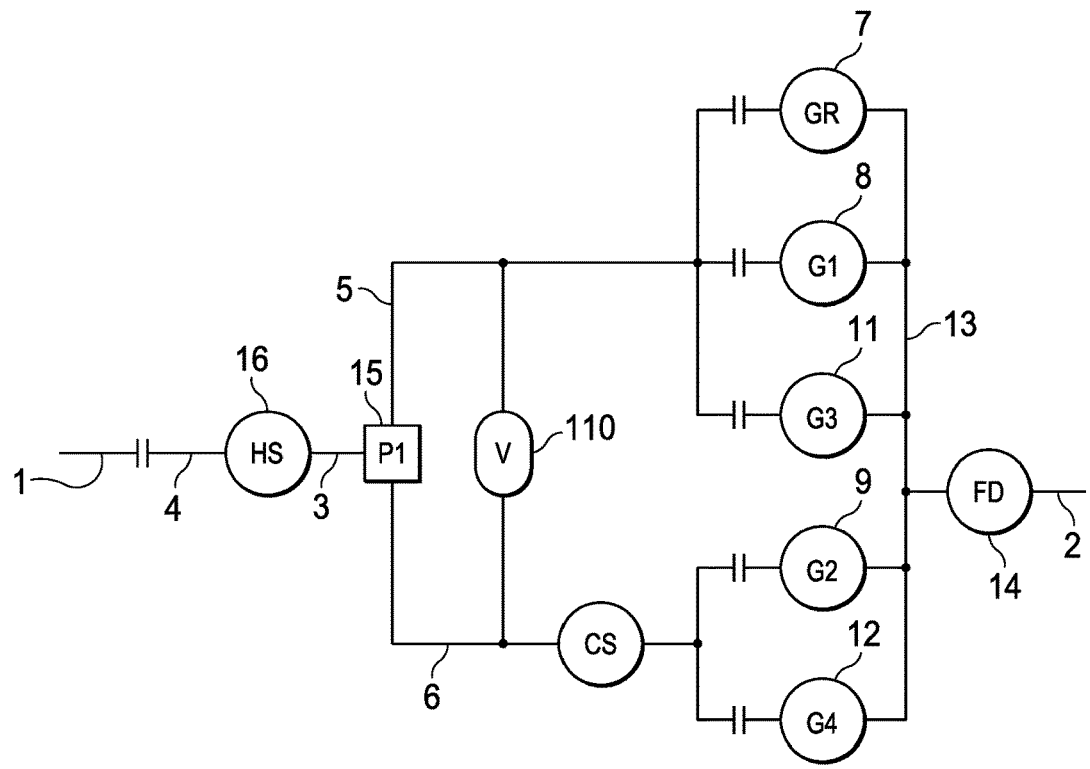
Figure 15C:
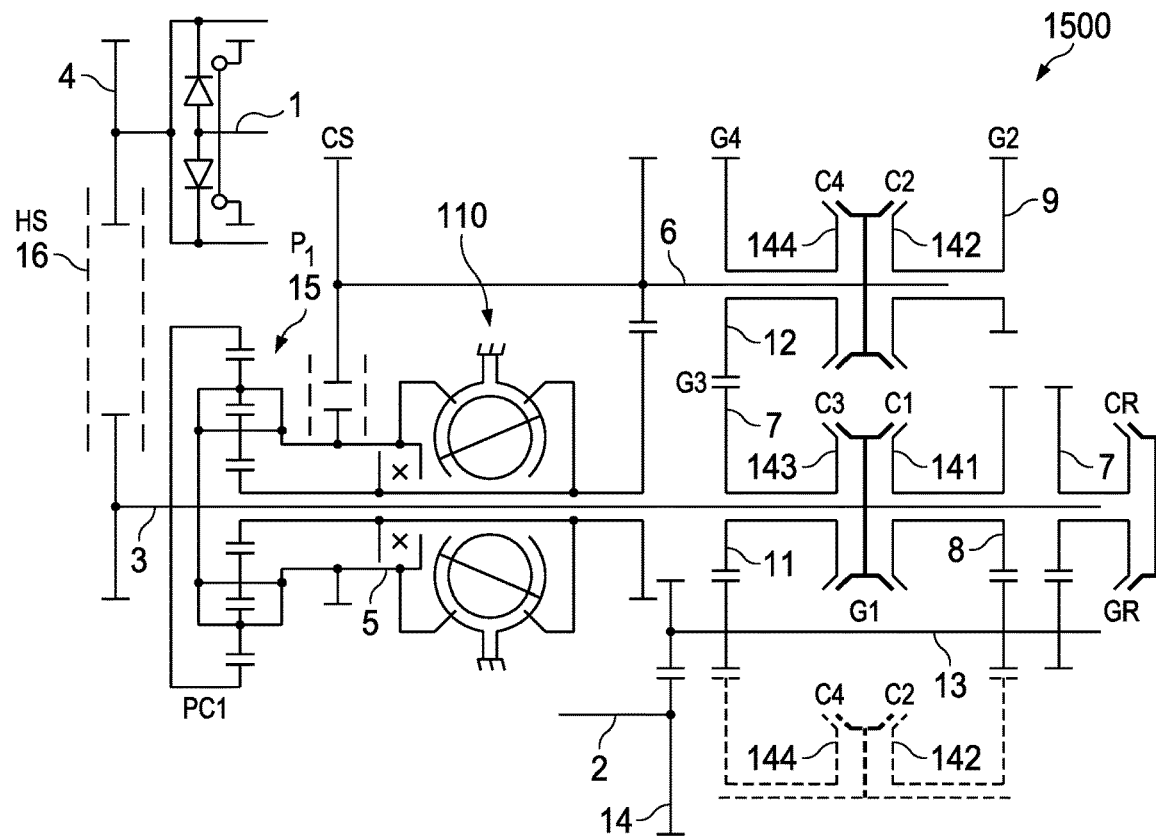
Figure 15D:
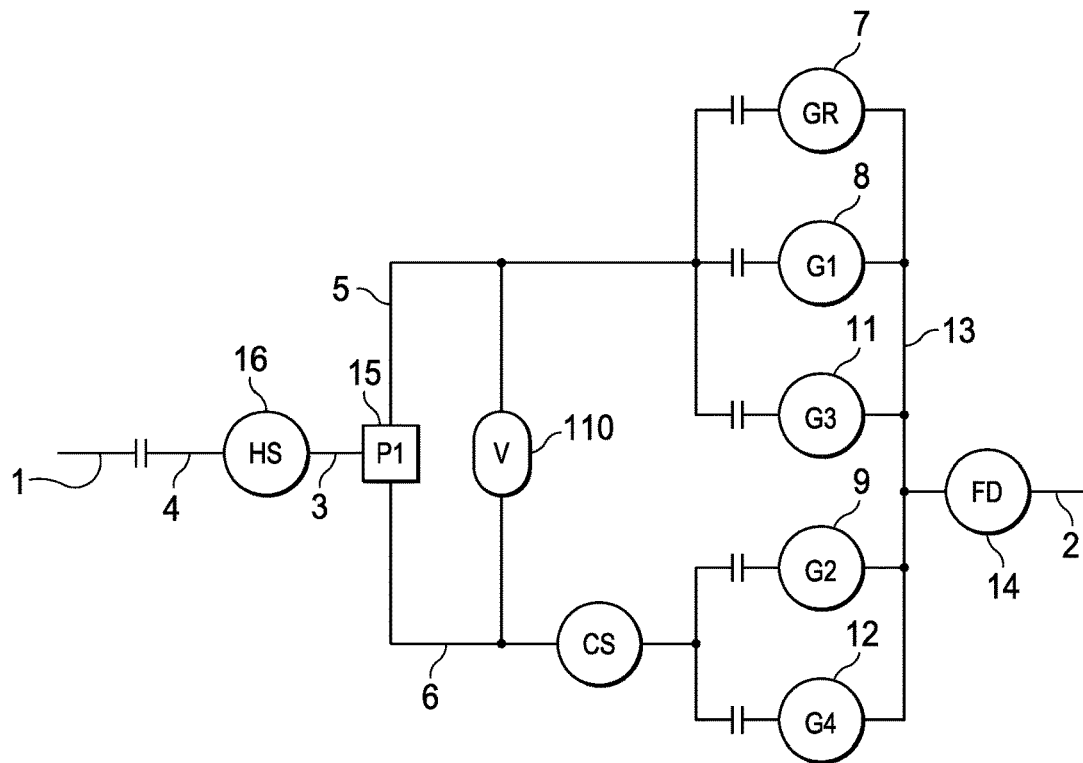
Figure 16:
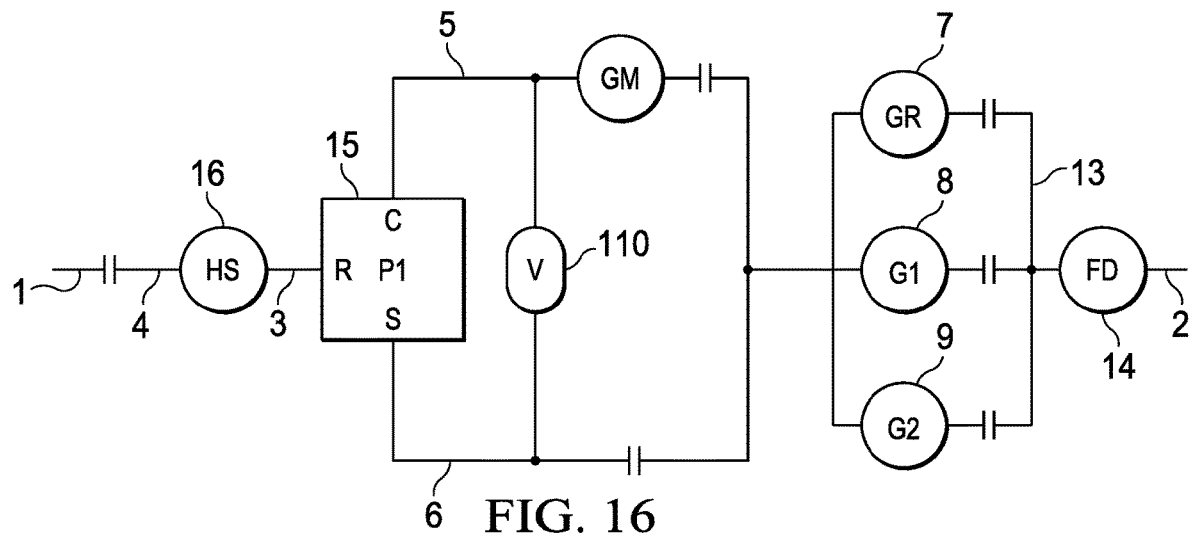

In some embodiments, such as depicted in FIGS. 4A-4B, 7A-7B, 9A-9B, 11A-11B, 12A-12B, 13A-13B, 14A-14B thru shaft 3 is coupled to a variator 110. Power exiting the variator 110 enters planetary gears set 15 and exits the planetary gearset 15 to a gearbox having a reverse clutch 145 for engaging with a reverse gear 7, a first clutch 141 for engaging with a first gear 8 and a second clutch 142 for engaging with a second gear 9. FIGS. 7A-7B and 13A-13B and 14A-14B further depict a third clutch 143 for engaging with a third gear 11. FIGS. 9A-9B further depict a fourth clutch 149 for engaging with a fourth gear 12 and the planetary gear set 15 is a double planetary gear set. FIGS. 12A-12B, 13A-13B, 14A-14B depict embodiments in which power may bypass the variator in a first configuration but enter variator 110 in a second configuration. Power routed through any of the gears (7, 8, 9, 11, 12) is transmitted via a countershaft 13 to a final drive 14 and exits via output shaft 2.

Figure 6A:
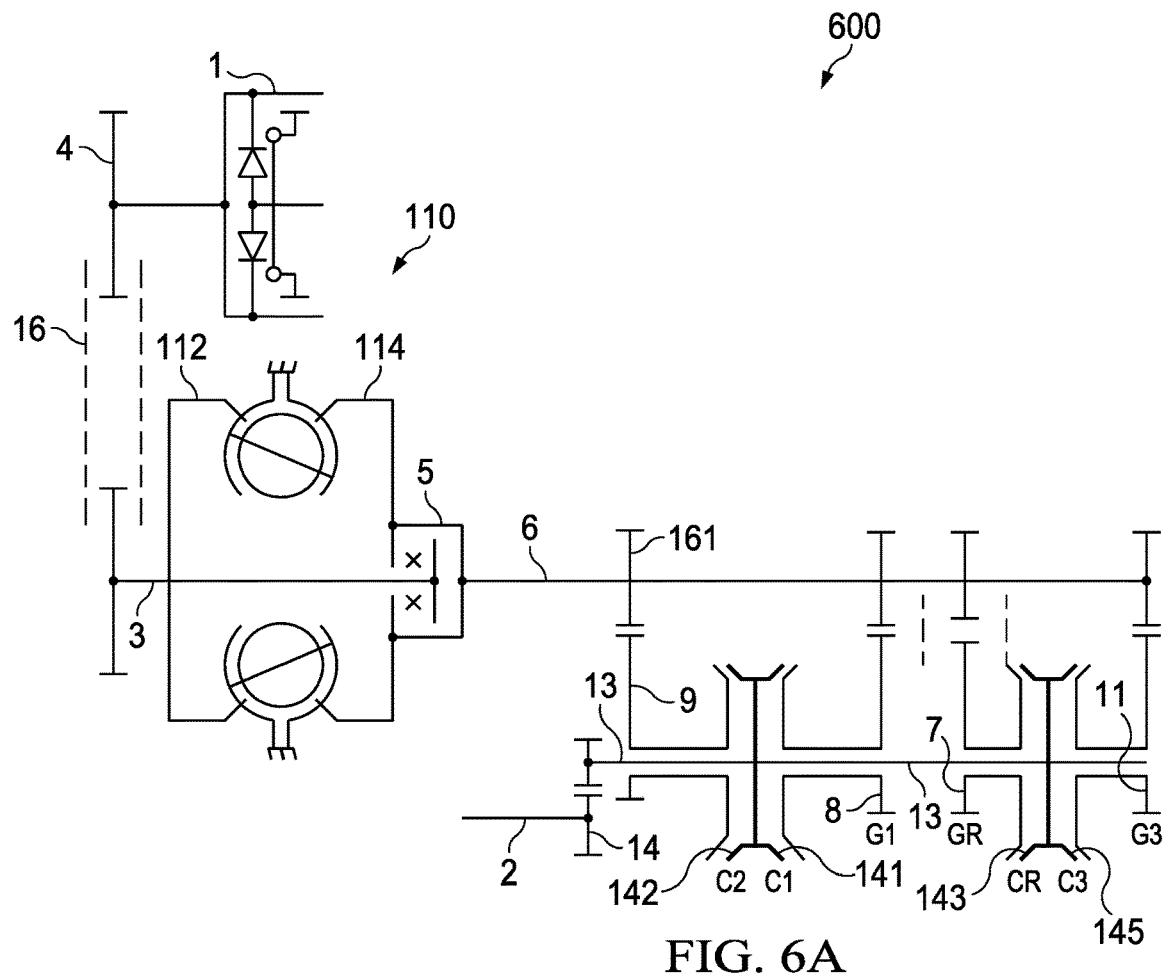
Figure 6B:
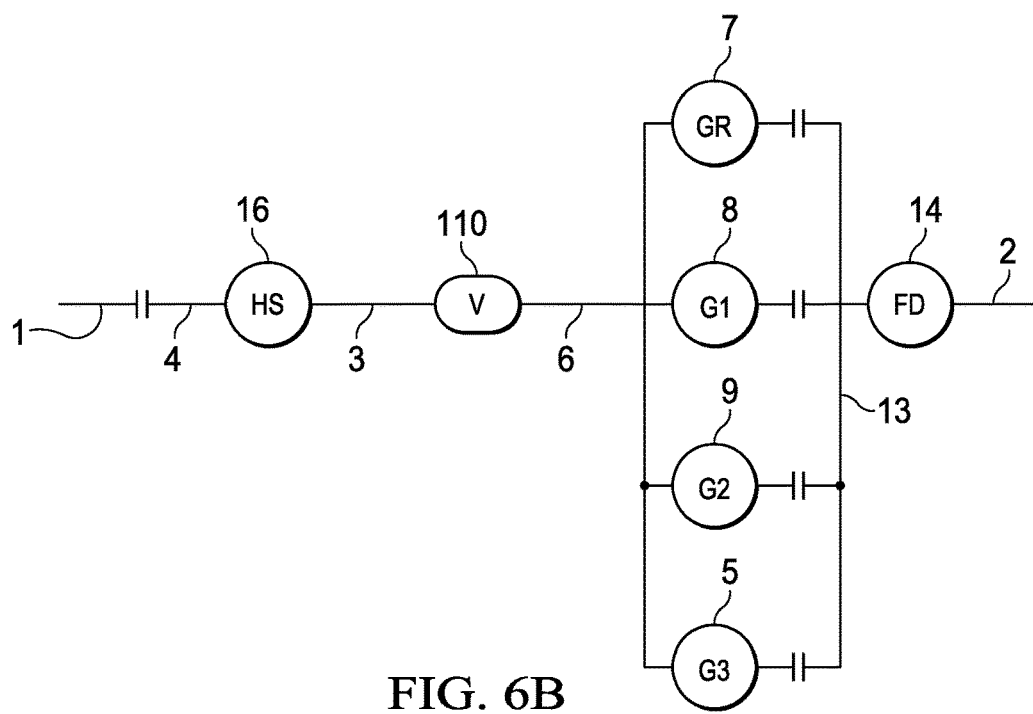
Figure 7A:
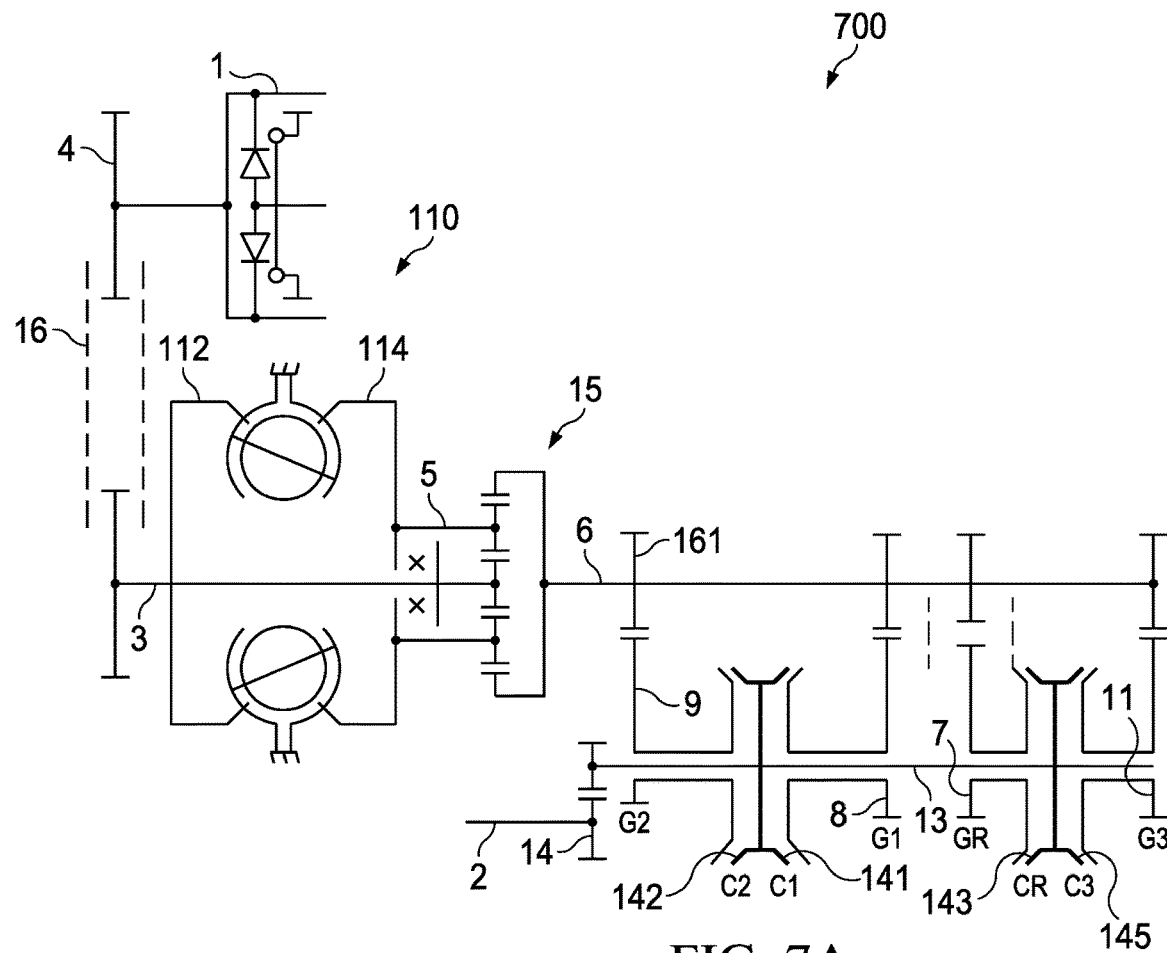
Figure 7B:
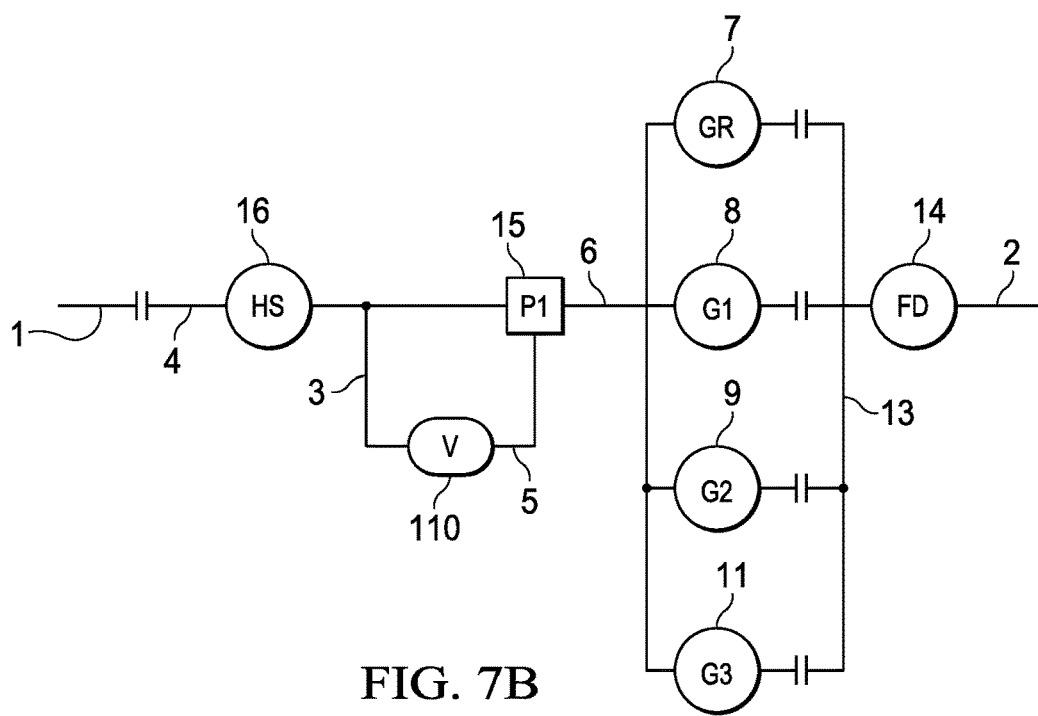
Figure 8A:
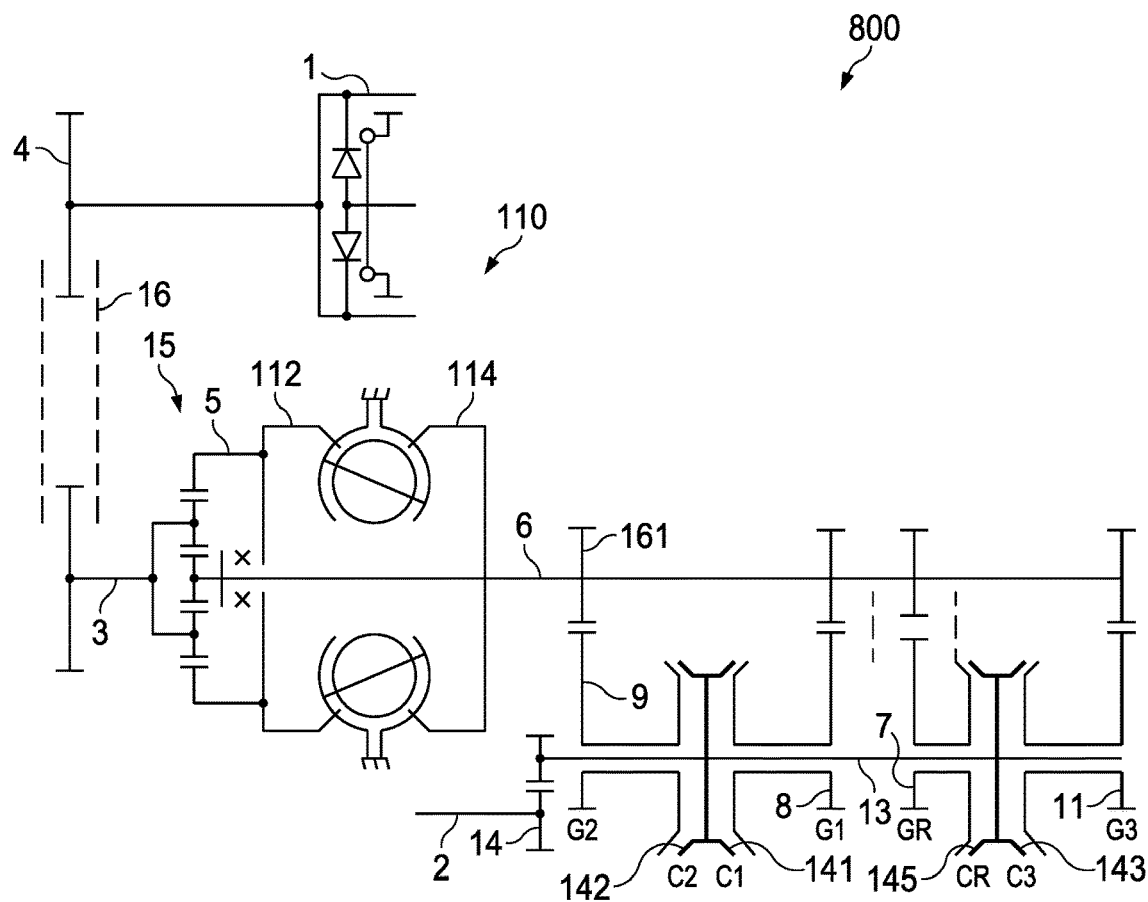
Figure 8B:
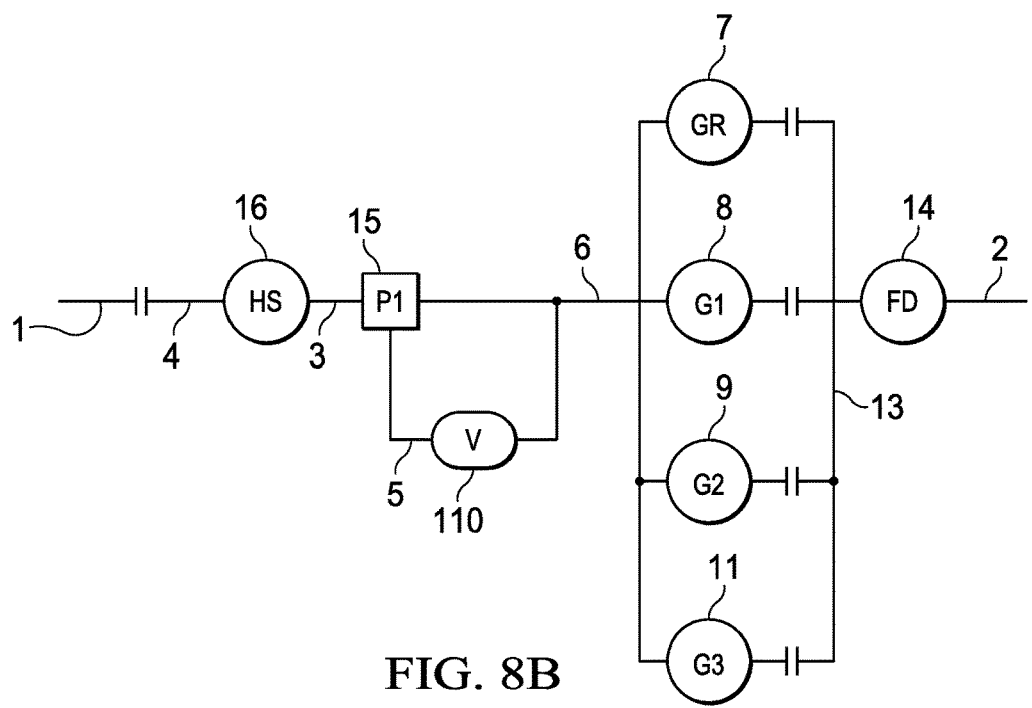

In some embodiments, such as depicted in FIGS. 5A-5B, 6A-6B, thru shaft 3 is coupled to a variator 11. Power exiting the variator 110 enters a gearbox having a reverse clutch 145 for engaging with a reverse gear 7, a first clutch 141 for engaging with a first gear 8 and a second clutch 142 for engaging with a second gear 9. FIGS. 6A-6B further depict a third clutch 143 for engaging with a third gear 5. Power routed through any of these gears (7, 8, 9, 5) is transmitted via a countershaft 13 to a final drive 14 and exits via output shaft 2.

In some embodiments, such as depicted in FIGS. 8A-8B, 10A-10B, 15A-15B, 15C-15D, 16 thru shaft 3 is coupled to planetary gear set 15 which is coupled to variator 110. Power exiting variator 110 enters a gearbox having a reverse clutch 145 for engaging with a reverse gear 7, a first clutch 141 for engaging with a first gear 8, a second clutch 142 for engaging with a second gear 9 and a third clutch 143 for engaging with a third gear 11. FIGS. 10A-10B, 15A-15B further depict a third clutch 143 for engaging with a third gear 11, a fourth clutch 144 for engaging with a fourth gear 12 and the planetary gear set 15 is a double planetary gear set. Power routed through any of these gears is transmitted via a countershaft 10 to a final drive (FD) and exits via output shaft 2.

Figure 17:
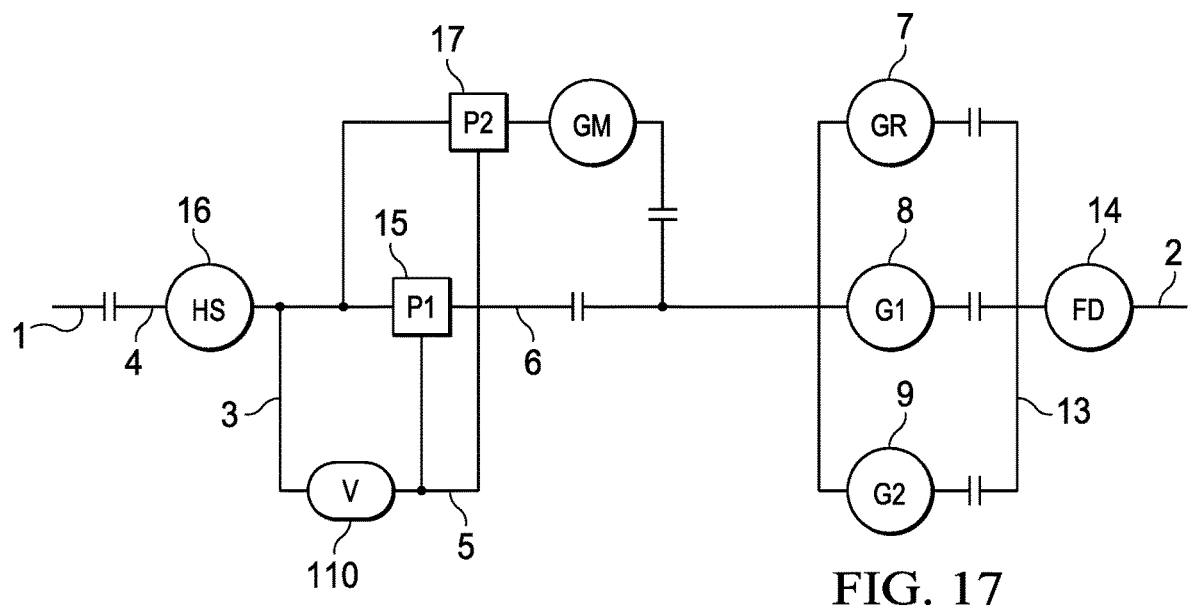

FIG. 17 depicts a second planetary gear set 17 for transmitting power from the variator to the gearbox.

The foregoing description details certain embodiments of the present disclosure. It will be appreciated, however, that no matter how detailed the foregoing appears in text, the present disclosure can be practiced in many ways.

What is claimed is:

1. A transmission comprising:
   a double planetary gearset for receiving rotary power from an input source;
   a variator coupled to the double planetary gearset, the variator configured for stepless adjustment of a speed ratio over a range of speed ratios between a first maximum speed ratio and a second maximum speed ratio;
   a first countershaft associated with a first gear;
   a second countershaft associated with a second gear, wherein each of the first countershaft and the second countershaft is configured to receive power from the variator;
   an output shaft configured to receive power from each of the first gear and the second gear; and
   a control system comprising:
      a first clutch corresponding to the first gear;
      a second clutch corresponding to the second gear; and
      a controller communicatively coupled to the variator, the first clutch, and the second clutch, wherein the control system is configured to adjust the speed ratio of the variator and selectively engage the first gear or the second gear, wherein in a first mode, the control system is configured to engage the first gear on the first countershaft and adjust the variator from the first maximum speed ratio to the second maximum speed ratio to increase the transmission ratio from a first transmission ratio to a second transmission ratio, wherein in a second mode, the control system is configured to engage the second gear on the second countershaft and adjust the variator from the second maximum speed ratio to the first maximum speed ratio to increase the transmission ratio from the second transmission ratio to a third transmission ratio, wherein changing from the first mode to the second mode comprises disengaging the first clutch from the first gear and engaging the second clutch to the second gear, wherein in the first mode power is transmitted through the double planetary gearset and the variator according to a first power path, wherein in the second mode power is transmitted through the double planetary gearset and the variator according to a second power path, wherein changing from the first mode to the second mode comprises controlling the double planetary gearset, wherein in the first mode power is transmitted from a first set of planetary gears to the variator, wherein in the second mode power is transmitted from a second set of planetary gears to the variator, and wherein changing from the first mode to the second mode comprises changing from the first set of planetary gears to the second set of planetary gears.

2. The transmission of claim 1, wherein changing from the first mode to the second mode comprises changing a configuration of the variator.

3. The transmission of claim 2, wherein the variator comprises a ball planetary continuously variable transmission comprising a plurality of traction planets, and wherein the control system is configured to change a tilt angle of the plurality of traction planets to adjust the speed ratio of the variator.

4. The transmission of claim 3, wherein the variator comprises a first traction ring on a first side of the plurality of traction planets, a second traction ring on a second side of the plurality of traction planets, and a sun located radially inward of the plurality of traction planets, wherein in a first mode power is transferred from the first traction ring through the plurality of traction planets to one of the second traction ring or the traction sun, and wherein in a second mode power is transferred from the second traction ring through the plurality of traction planets to the first traction ring.

5. The transmission of claim 1, wherein the input source comprises a prime mover, wherein the control system comprises a prime mover controller and a plurality of sensors associated with the prime mover and the transmission, and wherein the control system is further configured to:
   receive an input signal associated with a target output power; and
   adjust one or more parameters of the prime mover and the transmission to achieve the target output power.

6. The transmission of claim 5, wherein the control system is further configured to operate according to one of a plurality of control algorithms, wherein in an efficiency control algorithm the prime mover and the transmission are controlled to operate the prime mover based on an efficiency map, and wherein in a power control algorithm the prime mover and the transmission are controlled to operate the prime mover based on a power map.

7. The transmission of claim 6, wherein operating the control system in the efficiency control algorithm comprises maintaining the prime mover within an operating range for input power efficiency.

8. The transmission of claim 6, wherein operating the control system in the power control algorithm comprises adjusting the prime mover over a range of power inputs for the target output power.

9. A transmission comprising:
   a planetary gearset for receiving rotary power from an input source;
   a variator coupled to the planetary gearset, the variator configured for stepless adjustment of a speed ratio over a range of speed ratios between a first maximum speed ratio and a second maximum speed ratio;
   a first countershaft associated with a first gear;
   a second countershaft associated with a second gear, wherein each of the first countershaft and the second countershaft is configured to receive power from the variator;

an output shaft configured to receive power from each of the first gear and the second gear;
a third gear associated with the first countershaft;
a third clutch corresponding to the third gear;
a fourth gear associated with the second countershaft;
a fourth clutch corresponding to the fourth gear; and
a control system comprising:
  a first clutch corresponding to the first gear;
  a second clutch corresponding to the second gear; and
  a controller communicatively coupled to the variator, the first clutch, and the second clutch, wherein the control system is configured to adjust the speed ratio of the variator and selectively engage the first gear or the second gear, wherein in a first mode, the control system is configured to engage the first gear on the first countershaft and adjust the variator from the first maximum speed ratio to the second maximum speed ratio to increase the transmission ratio from a first transmission ratio to a second transmission ratio, wherein in a second mode, the control system is configured to engage the second gear on the second countershaft and adjust the variator from the second maximum speed ratio to the first maximum speed ratio to increase the transmission ratio from the second transmission ratio to a third transmission ratio, wherein changing from the first mode to the second mode comprises disengaging the first clutch from the first gear and engaging the second clutch to the second gear, wherein in a third mode the control system engages the third gear on the first countershaft and adjusts the variator from the first maximum speed ratio to the second maximum speed ratio to increase the transmission ratio from the third transmission ratio to a fourth transmission ratio, wherein in a fourth mode the control system engages the fourth gear on the second countershaft and adjusts the variator from the second maximum speed ratio to the first maximum speed ratio to increase the transmission ratio from the fourth transmission ratio to a fifth transmission ratio, wherein changing from the second mode to the third mode comprises disengaging the second clutch from the second gear and engaging the third clutch to the third gear, and wherein changing from the third mode to the fourth mode comprises disengaging the third clutch from the third gear and engaging the fourth clutch to the fourth gear.

10. The transmission of claim 9, further comprising:
an infinitely variable transmission (IVT) clutch;
a IVT gear coupled to the first countershaft;
an output planetary gearset coupled to the output shaft; and
a forward clutch coupled to the output planetary gearset, wherein the control system is further configured to engage the forward clutch for the first mode or the second mode, wherein in an IVT mode the control system is further configured to engage the IVT clutch to the IVT gear and engage the fourth clutch to the fourth gear, and wherein the control system is further configured to adjust the speed ratio of the variator to one of a positive transmission ratio, a negative transmission ratio, and a powered zero transmission ratio.

11. A transmission comprising:
a planetary gearset for receiving rotary power from an input source;
a variator coupled to the planetary gearset, the variator configured for stepless adjustment of a speed ratio over a range of speed ratios between a first maximum speed ratio and a second maximum speed ratio;
a first countershaft associated with a first gear;
a second countershaft associated with a second gear, wherein each of the first countershaft and the second countershaft is configured to receive power from the variator;
an output shaft configured to receive power from each of the first gear and the second gear;
an infinitely variable transmission (IVT) clutch;
a IVT gear coupled to the second countershaft;
an output planetary gearset coupled to the output shaft;
a forward clutch coupled to the output planetary gearset; and
a control system comprising:
  a first clutch corresponding to the first gear;
  a second clutch corresponding to the second gear; and
  a controller communicatively coupled to the variator, the first clutch, and the second clutch, wherein the control system is configured to adjust the speed ratio of the variator and selectively engage the first gear or the second gear, wherein in a first mode the control system is configured to engage the first gear on the first countershaft and adjust the variator from the first maximum speed ratio to the second maximum speed ratio to increase the transmission ratio from a first transmission ratio to a second transmission ratio, wherein in a second mode, the control system is configured to engage the second gear on the second countershaft and adjust the variator from the second maximum speed ratio to the first maximum speed ratio to increase the transmission ratio from the second transmission ratio to a third transmission ratio, wherein changing from the first mode to the second mode comprises disengaging the first clutch from the first gear and engaging the second clutch to the second gear, wherein the control system is further configured to engage the forward clutch for the first mode or the second mode, wherein in an IVT mode the control system is further configured to engage the IVT clutch to the IVT gear and engage the first clutch to the first gear, wherein the control system is further configured to adjust the speed ratio of the variator to one of a positive transmission ratio, a negative transmission ratio, and a powered zero transmission ratio, and wherein the control system is further configured to disengage the IVT clutch from the IVT gear and engage the forward clutch to change from the IVT mode to the first mode.

* * * * *